(12) United States Patent
Nevin, III

(10) Patent No.: US 8,799,323 B2
(45) Date of Patent: Aug. 5, 2014

(54) METHOD AND APPARATUS FOR DISPLAYING DATA STORED IN LINKED NODES

(75) Inventor: Rocky Harry W. Nevin, III, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/198,301

(22) Filed: Aug. 4, 2011

(65) Prior Publication Data

US 2012/0005239 A1    Jan. 5, 2012

Related U.S. Application Data

(63) Continuation of application No. 10/810,407, filed on Mar. 26, 2004, now Pat. No. 8,019,786, which is a continuation of application No. 09/578,127, filed on May 24, 2000, now Pat. No. 6,714,936.

(60) Provisional application No. 60/135,740, filed on May 25, 1999.

(51) Int. Cl.
*G06F 7/00* (2006.01)
*G06F 17/30* (2006.01)

(52) U.S. Cl.
CPC .............................. *G06F 17/30958* (2013.01)
USPC .......................................... 707/797; 707/798

(58) Field of Classification Search
CPC .................... G06F 17/30395; G06F 17/30958; Y10S 707/99943
USPC ................................................. 707/797, 798
See application file for complete search history.

(56) References Cited

U.S. PATENT DOCUMENTS

| | | | | |
|---|---|---|---|---|
| 5,295,261 | A | | 3/1994 | Simonetti .......................... 707/2 |
| 5,515,487 | A | | 5/1996 | Beaudet et al. ................ 345/440 |
| 5,546,529 | A | * | 8/1996 | Bowers et al. ................. 715/848 |
| 5,596,703 | A | | 1/1997 | Eick et al. ...................... 395/326 |
| 5,740,421 | A | * | 4/1998 | Palmon ................................. 1/1 |
| 5,751,931 | A | | 5/1998 | Cox et al. ....................... 345/440 |
| 5,778,377 | A | | 7/1998 | Marlin et al. .................. 707/103 |
| 5,812,134 | A | | 9/1998 | Pooser et al. .................. 715/848 |
| 5,835,085 | A | | 11/1998 | Eick et al. ...................... 345/326 |
| 5,895,474 | A | | 4/1999 | Maarek et al. ................. 707/514 |
| 5,963,965 | A | * | 10/1999 | Vogel ............................. 715/236 |
| 5,987,460 | A | * | 11/1999 | Niwa et al. ........................... 1/1 |
| 6,067,548 | A | | 5/2000 | Cheng ........................... 707/103 |
| 6,144,962 | A | * | 11/2000 | Weinberg et al. ..................... 1/1 |
| 6,154,750 | A | | 11/2000 | Roberge et al. ............. 707/104.1 |
| 6,216,134 | B1 | * | 4/2001 | Heckerman et al. .......... 707/749 |
| 6,256,623 | B1 | * | 7/2001 | Jones ............................. 707/765 |
| 6,300,957 | B1 | | 10/2001 | Rao et al. ....................... 345/441 |
| 6,336,123 | B2 | | 1/2002 | Inoue et al. ................. 715/501.1 |

(Continued)

OTHER PUBLICATIONS

Webopedia, Jan. 16, 2010 http://www.webopedia.com/TERM/v/virtual_reality.html, Jan. 16, 2010.

(Continued)

*Primary Examiner* — Shew-Fen Lin
(74) *Attorney, Agent, or Firm* — Martine Penilla Group, LLP

(57) ABSTRACT

A computer implemented method of storing, manipulating, assessing, and displaying data and its relationships, and a computer system (with memory) programmed to implement such method. The data is stored into nodes, and visualized as a sea of linked nodes.

26 Claims, 9 Drawing Sheets

(56) References Cited

U.S. PATENT DOCUMENTS

| | | | |
|---|---|---|---|
| 6,360,227 B1 | 3/2002 | Aggarwal et al. | 707/102 |
| 6,377,287 B1* | 4/2002 | Hao et al. | 715/853 |
| 6,486,898 B1 | 11/2002 | Martino et al. | 345/853 |
| 6,509,898 B2 | 1/2003 | Chi et al. | 345/440 |
| 6,594,673 B1* | 7/2003 | Smith et al. | 1/1 |
| 2001/0045952 A1* | 11/2001 | Tenev et al. | 345/440 |
| 2002/0013834 A1* | 1/2002 | Esakov et al. | 709/223 |
| 2004/0133555 A1* | 7/2004 | Toong et al. | 707/2 |

OTHER PUBLICATIONS

Vr.isdale.com, http://vr.isdale.com/WhatIsVR/noframes/WhatIsVR4.1-A.html, Jan. 16, 2010.

George H. Collier, "Thoth-II: hypertext with explicit semantics," Conference on Hypertext and Hypermedia Proceedings of the ACM Conference on Hypertext, pp. 269-289, 1987.

* cited by examiner

METHOD AND APPARATUS FOR DISPLAYING DATA STORED IN LINKED NODES

CROSS-REFERENCE TO RELATED APPLICATION

The present application is a continuation of U.S. patent application Ser. No. 10/810,407, filed on Mar. 26, 2004, now U.S. Pat. No. 8,019,786 which is a continuation of U.S. patent application Ser. No. 09/578,127, filed on May 24, 2000 (issued as U.S. Pat. No. 6,714,936), and claims the benefit of U.S. Provisional Application No. 60/135,740, filed May 25, 1999.

FIELD OF THE INVENTION

The invention is a computer implemented method of storing, manipulating, accessing, and displaying data and its relationships, and a computer system (with memory containing data) programmed to implement such method.

BACKGROUND OF THE INVENTION

Today's GUI (graphical user interface) software requires a great deal of training for proficiency. They rarely show their context and rarely show internal data and control points. The actions of applications should be fast and easy to use, not confusing and restrictive.

Shortcomings of current technologies include the following:

Awkward Navigation:

Navigating a current GUI is to learn how the programmers have organized the data and the control points. Today's UI (user interface) relies on windows and pull-down menus which hide prior ones as the user makes selections, and an often-complex series of mouse selections to navigate to the desired control point. In performing an action after traversing a path of pull-down menus and button selections on different sub-windows, the user may be returned to the beginning, forced to retrace their steps if they wish to apply an action repeatedly. The UI does not shift from one state to another in a smooth way.

Relationships are Invisible:

Current GUI's with pop-up menus and layers of text-based windows. Today's GUI's suffer from a list mentality: rows of icons with little or no meaning in their position, no relationships readily visible between themselves or to concepts which the user may be interested in or have knowledge of.

The standard GUI concept of a canvas with buttons and pull-downs require reading and thinking about the meaning of text to, hopefully, grasp the model of control flow. Virtually no information is given outside of static text to help the user understand relationships and control points.

Access to Crucial Data is Confusing:

Gaining access to fields or parameters in current applications can also be a challenge. For example, the Microsoft POP mail retrieval service uses a configuration profile defined by the user to access the mail server, and displays the name of that configuration when logging. Although one sees evidence of the existence of this configuration, how does one change it? The answer may not be obvious. An object-oriented system that implemented all actions on an object could also provide the mechanism of self-deletion, but this helps only if the object itself is visible and accessible via the GUI. This is what DataSea does. Windows technology is moving in this direction, by having many words in menus modifiable, but DataSea achieves this automatically by virtue of its design.

GUI Design is Bug-Prone:

A complex GUI, such as a presentation and control system for database administration, today consists of many canvases and widgets which hopefully present, through multiple mouse clicks, all information that is available. Any data can be changed by any part of the program, and this leads to bugs if the programmer can not easily see these interactions. A DataSea presentation of data and control shows all the objects and their relationships, and thus shows immediately what nodes can affect changes to the data, reducing bugs. To turn a DataSea view into an "application" means to set internal parameters, create and link together application nodes, and add programmatic instructions to these nodes. DataSea will implement a means to invoke these instructions.

Interoperability Conflicts:

DataSea can serve as the single source of data for any application. Any RDBMS (relational database management system) can do this, but DataSea is completely flexible in its data storage and linkage, guaranteeing forward compatibility by eliminating the risk of changes to database structure and entity-relationships of RDBs (Relational Databases).

Two separate DataSea databases can be joined, and automatic linkage routines will merge them without programmer effort. This is generally impossible in RDBs. This joining can occur by simply adding nodes and links from the two data sets, and adding together the contents of the master index, NameListObj. Or, the two data sets can be blended, merging their contents: taking two nodes with the same name from the two separate data sets, creating one node which has all the links from the two separate nodes.

In most storage systems, especially RDBMS's, the user must know how information is stored in the computer and which parameter or parameters that the computer is using to store the data, as well as the proper range of values. This is often non-intuitive and may seem somewhat arbitrary for a non-technical user. Ideally, the computer would better mimic human associative memory, allowing the user to look for new information associated with that which is better known, such as a particular context, or a range of values without regard to parameterization, to specify the target of interest.

OLAP (online analytical processing) and data mining require both analytical models and custom code to apply these models to particular database structures. These customizations may be hard-coded, non-portable and irrelevant to the model. The DataSea API (application programming interface) provides access to all data while eliminating the need to worry about database structure such as tables, columns and foreign keys.

Shortcomings of more recent data presentation technologies include the following:

Non-Linear Viewing:

Up-coming non-linear presentation tools such as fish-eye or hyperbolic views do not address the difficult problem of how to lay out the data and their relationships before the viewing method is applied. These may be useful, but do not address the difficult issue of how the graph is laid out initially. Nor are they appropriate for highly linked data sets, because the plethora of links resembles a cobweb from a psychotic spider.

Virtual Reality:

VR takes advantage of visual clues and spatial awareness, but only for data sets that may be appropriately mapped to a 3-dimensional space. Generally data is N-dimensional and thus, in general, virtual-reality which models information as physical objects in 3D space is inappropriate for viewing arbitrary data.

Voice Interface:

even more than a GUI, voice control needs a smooth transition from state to state in response to commands so that the user can follow what is happening. GUIs hide previous states with new windows, while the present invention moves objects gradually and continuously in response to programmatic or user events.

SUMMARY OF THE INVENTION

The inventive method (referred to as "DataSea") is a method for storing, accessing, and visualizing information. Data is stored into nodes and visualized as a 'sea' of linked nodes. Nodes can contain anything such as documents, movies, telephone numbers, applications or words containing concepts. Interactions with the user organize the data from a defined, and then refined, point of view, with relevant data brought to their attention by smooth changes in the data's appearance.

Essentially, a handful of nodes (which are typically selected by value) are linked to the point of view turning the web of data into a hierarchical network. Further order is imposed by the use of two types of commands: one which relies on the data values, the other on the links and types of the data nodes.

The user typically enters words into a computer programmed in accordance with DataSea and watches DataSea's response. Individual nodes are rendered according to the sequence of nodes between themselves and the point of view, allowing different presentations of data. Applications may be stored into nodes and can be located and executed by DataSea. These applications can operate on and present information from DataSea in the conventional manner, with windows and menus, or by using the DataSea mechanisms of visualization, including the so-called virtual reality mode ("VR-mode") which supports deterministic data placement as needed in such things as forms and spread sheets.

Examples of use include:
1. Entering keywords and phrases selectively retrieves and emphasizes different data types such as loose notes and email, but these entered keywords and phrases need not match exactly the content of the resulting emphasized data.
2. Direct and specific information is retrieved: The user enters the name of "Jim Smith" followed by an appropriate command such as "back" or "and" along with the phrase "Phone number" which refers to a pre-existing AN. Jim's telephone number becomes obvious as it approaches the point of view, which in this case is "Jim Smith".
3. A manufacturing facility has test data from machines and 3-D models of those machines. These data sources are integrated and the user can visualize the facility from different points of view, e.g. a virtual reality mode, tabular presentation or the standard DataSea network connectivity display.

Figure 1:
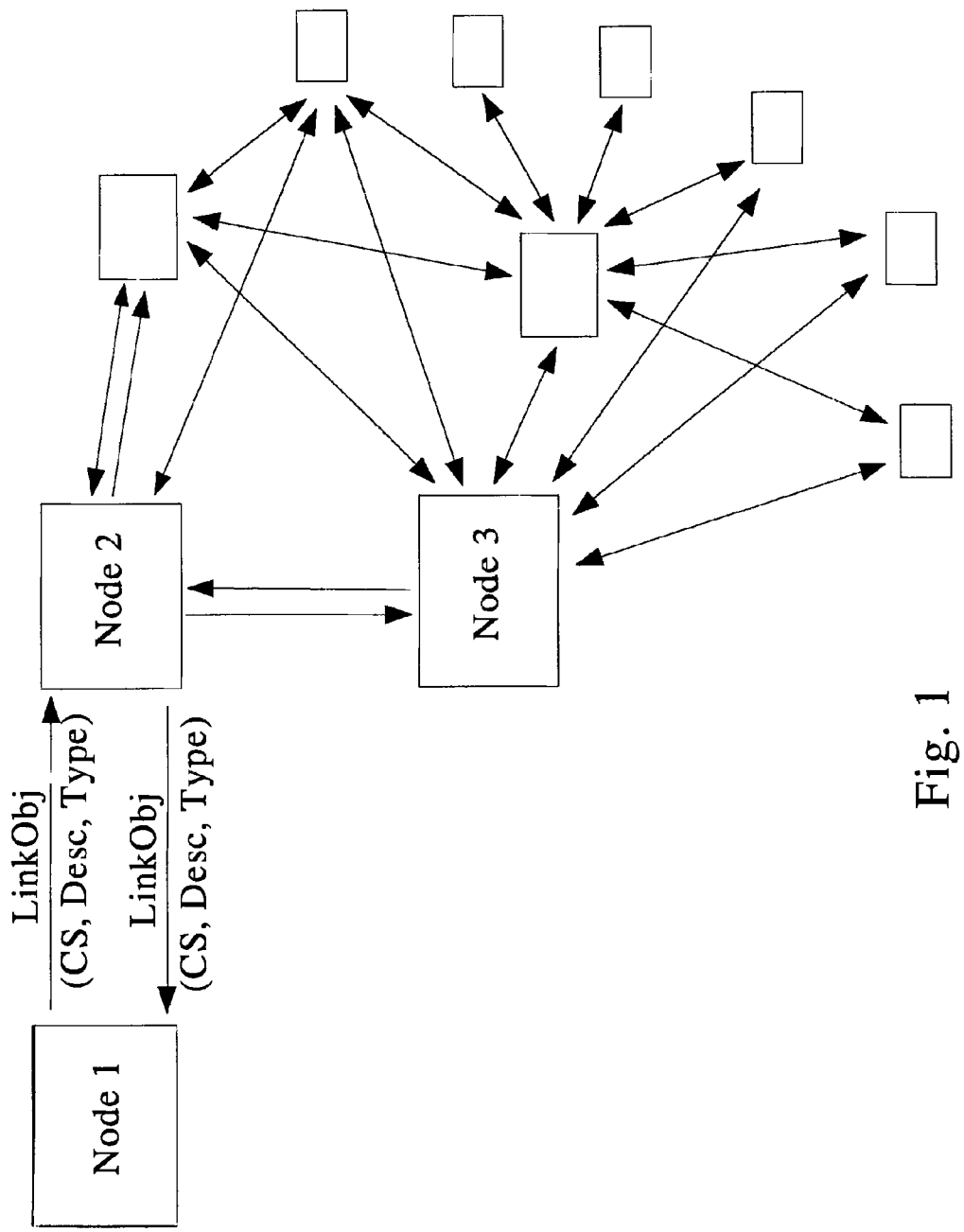
FIG. 1 is a diagram of relationships between nodes which can be visualized in accordance with the invention.

Each of FIGS. 4, 5, 6, 7, 8, and 9 is an example of a display generated in accordance with the invention.

PREFERRED EMBODIMENT OF THE INVENTION

This is a disclosure of computer implemented methods for storing, manipulating, accessing and displaying data and its relationships, and of computer systems programmed to implement such methods.

These methods are flexible, applicable to any kind of data and are useful to diverse groups of users. A prototype is implemented in the Java programming language.

Data is stored into nodes which are linked together. All nodes contain variables, including descriptions, types, magnitudes and timestamps. Links also contain information about themselves, including connection strength of the link and descriptive information.

Data is accessed and modified based on the values of data, their relationships, the values of DataSea parameters and links between nodes, rather than pre-determined locations in memory, as is done in most programming models.

Any existing application can be emulated in DataSea by creating and linking appropriate nodes. Positions of nodes as displayed on the screen are a result of processing force parameters rather than pre-determined positions.

Commands to DataSea are not chosen from hierarchical lists or menus, but rather they are
1. Simple navigation commands;
2. Words (data values) generated by the user; and
3. References to nodes brought to user's attention.

This approach to the command interface, and the smooth changes of state in visual feedback, lends DataSea to voice input and thus wireless 'PDA' (personal digital assistant) type devices.

Key aspects of the invention are:
1. nodes which can contain any type of data, links between the nodes;
2. manipulation of internal parameters of nodes and links;
3. visualization of nodes and their internal parameters;
4. smooth transitions during changes in state of the network;
5. integration of virtual reality representations;
6. simple commands and low learning curve;
7. increased robustness to imprecise commands as the data set grows and matures;
8. obviation of the need to predetermine data structures when entering new data; and
9. integration of legacy data with the structure inherent in it.

Definitions

'POV' stands for 'Point of View' and is the designation given a node from which many operations are begun, such as defining a hierarchy of distance in terms of links of any node to the POV.

'DN' refers to a data node containing specific values of a parameter. 'AN' refers to an abstract node, which contains a summary, abstract, or explanation of the data stored in one or more DNs, and represents a concept or parameter name which can link and thereby group one or more DNs. E.g., "address" is an AN, while the specific address "123 Main St." is a DN.

DN("abc") refers to a data node named "abc". AN("xyz") refers to a AN named "xyz".

'magnify' means to change the value of the magnitude variable ('mag') or related variables inside a node and or its links.

'distance' refers to the minimum number of links between two nodes, also called the link-distance.

'conceptual distance' refers to a more complex function of link distance and other parameters including mag, link-connection-strength and total number of links to a node. For instance, the conceptual distance between two nodes which are several links apart can be proportional to the product of the link connection-strengths times the product of the mag's divided by a function of the link-distance.

'near' refers to a relatively low distance or conceptual distance.

'commands' in DataSea are any programmatic methods of accessing, manipulating, creating or deleting data structures or elements of DataSea.

'applications' in DataSea are programs which use or modify data, links or resources of DataSea, and modify internal parameters of nodes or links, and or create or delete nodes.

'environment checking' refers to getting information about nodes and links in the neighborhood of or nearby one or more nodes.

'abbreviated' refers to incompletely rendering and positioning nodes.

'distal path' is a sequence of linked nodes, each node distal to the prior one.

'multiple paths' refers to more than one route, through links, between two nodes.

'interaction with DataSea' refers to either user interaction or programmatic interaction. User interaction is typically through the use of DataSea query language (keyboard or voice interface) and mechanical means such as a mouse. Programmatic interaction can result from DataSea nodes themselves or external programs.

'distal' refers to those nodes having a higher link-distance value (node.dist) than the link-distance value (this.dist) of the reference point or 'this': that is, node.dist>this.dist.

Proximal is the opposite, referring to lower distance.

'primary node' refers to a node directly connected to the reference point or 'this'.

'child' is a primary distal node, while 'parent' is a primary proximal node.

'setting a POV' means assigning an existing node as a point of view, or creating a new node and linking it directly to a number of existing nodes, specified at the time of creation of the POV or later.

"spreading mode" refers to the rules used in applying algorithms, possibly recursively, from one node to its neighbor or neighbors. Criteria might be dependent on proximal or distal progression, mag, CS (Connection Strength of a link), potentiation level, or other factors.

'Aliasing' refers to the mapping of a node to other nodes or a range of nodes. For instance, when an action is performed on the "tomorrow" node, it executes enough code to link itself to a node having the (absolute) value of tomorrow's date, dropping links to any other dates previously established. Linking a node to "today" results in linking to the node representing the absolute date. Depending on the spreading mode, related times will be more or less affected by commands. Nodes with TimeStamps closer to tomorrow will be affected more than those further away. Spreading can also be dependent on values and a range, e.g. decreasing the effect of "more" as $1/((current\_value-optimal\_value)/fuzziness\_range)$.

Integration of a GPS receiver, or simply assigning a static location in a map, will be used to alias the word "here".

"Presented data set" is what the user sees at the moment, being a collection of nodes with (mag>some threshold).

"Target data set" is an ideal collection of nodes representing the information the user is searching for.

"Traveling distally" means going from node A to node B only if B.dist is >A.dist.

"Traveling proximally" means going from node A to node B only if B.dist is <A.dist.

"Traveling downstream" means going from node A to node B only if A.getPol(B) is '−'. The polarization of the link between A and B can be set on entering the link between A and B, the order of A and B determining the polarization:

A.link(B, {polarization=}true) means

A.getPol(B) is '−'. Typically, nodes A and B are linked such that node B is downstream from node A when node A is more general than node B (so that by traveling downstream from node A to Node B, a user encounters more specific, rather than less specific, information). In characterizing a node, a user usually wants to see progressively more general (broader) information about it.

"Traveling upstream" means going from node A to node B only if A.getPol(B) is '+'.

A "Recently visited" node denotes a node being used in an operation which traverses the network. The node's TimeStamp is updated on a visit.

As shown in FIG. 1, each node has a link to at least one other node. Each link is defined by three values: CS (which is Connection Strength of a link, initially set to 1.0), Description (which is a free-form String describing the node), and Type (For example DN (data node) and AN (abstract node)).

Figure 2:
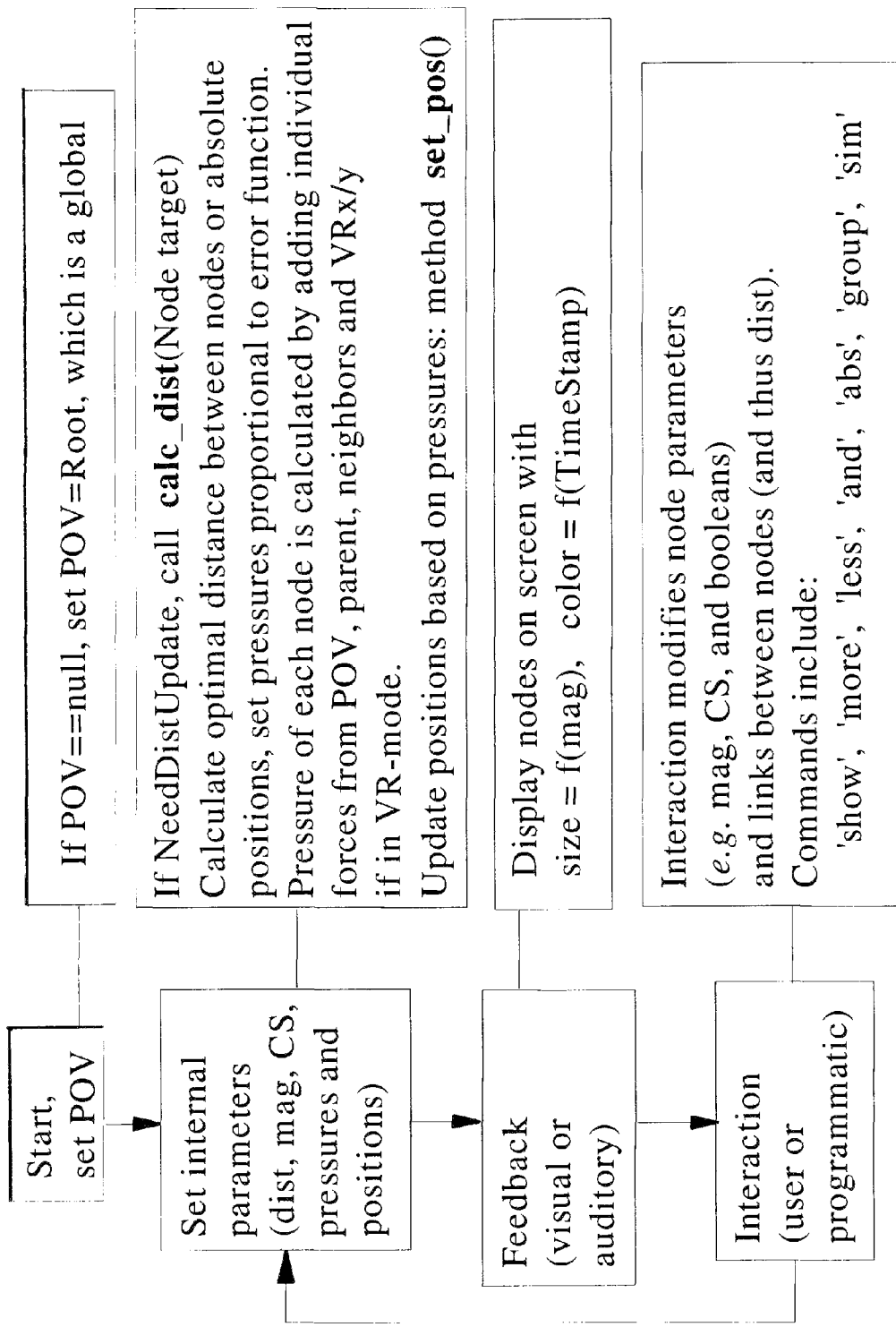
FIG. 2 is a flow chart of steps performed in accordance with the invention.

FIG. 2 is a flow chart of steps performed in accordance with the invention. First, a Point of View (POV) is set. Then, internal parameters associated with the POV are set. The internal parameters include those listed (with "pressure" denoting the values of summed forces influencing a node's position, "forces" denoting parameters indicative of pushing or pulling of the node's position relative to other nodes: positive or negative values calculated by repetitive interactions between any node and others, and global forces such as a 'drift' or 'gravity' biasing the positions of nodes, and "positions" denoting the location on the computer display, or more generally the doublet or triplet representing a node inside a virtual space, viewed on the computer's display). Then, feedback is provided to the user by displaying representations of the nodes on a display device in accordance with the internal parameters set in the second step. Optionally, auditory feedback is also provided to the user during the third step. As a fourth step, the user interacts by providing commands for modifying the internal parameters (both node parameters, such as magnitude, and link parameters, such as distance) set in the second step. The commands can include any of those listed, or any of those discussed below. In response to a command specified in the fourth step, the second step is performed again (to reset the internal parameters) and then the third step is performed again (to provide feedback indicative of the reset parameters).

Example of Using the Invention

A candy factory supervisor performs the following tasks (there are many different commands and choices of values which will give similar results):

views the facility (the candy factory) to get an overview of its status and sees a VR (virtual reality) rendering of the various stations, color-coded for activity (by using the command "show factory");

reviews the recent temperature history of one of the problem machines, a chocolate melter and sees the machine with clusters of data nearby ("reset, show Choc_2_Melter and Temperature and TimeLine and recent");

views the melter and groups data from it and sees the abstract nodes "Temp", "Up-Time" and "Operators" which categorize the data ("reset, show Choc_2_Melter, group")

checks for other applications which use data from the chocolate melter ("apps") and after seeing the familiar application named "AppMelterGraphs" invokes this canned application showing graphs of the melter's history ("reset, show AppMelterGraphs and Choc_2_Melter");

saves this point of view named "Daily" ("save Daily"). Later in the week, after forgetting its name is reminded by asking for saved POV's from last week ("show Saved and LastWeek");

checks unread mail ("reset, show Mail and unread and TimeLine"), and now de-emphasizes replies by himself ("less Me")

'Me' is an alias node, linking directly to a node representing his user ID;

begins an email to co-worker ("reset, show 'John Smith', AppMail"). "AppMail" is a canned application which starts from the current point of view and searches the neighborhood for two data nodes: a data node directly connected to an abstract node that is equivalent to "Name', and another data node connected to the abstract node "Address". It then formats a text window for composing an email message; and enters appointment with Scharffen Berger chocolate supplier (input "mtg tomorrow 4 pm 'Scharffen Berger'") and sees TimeLine with the event for Apr. 28, 1999, more info about the contact person at Scharffen Berger is visible.

DataSea is a comprehensive program that stores, manipulates and visualizes all forms of data. Visually animated objects, or nodes, represent data or abstract concepts. Interactive commands (which something like verbs) operate on nodes and the links between them (which act something like nouns). These commands change internal parameters of the nodes and links. These parameters are visualized by qualities such as position and size. Certain nodes are emphasized, presenting information. The user finds the data or resource needed without knowledge of the data structure.

Unusual features of DataSea include relatively natural commands, robustness to imprecise queries, ability to generalize, absence of restrictive structure, use of semantic information and smooth transitions between visual states of the user interface. The simple commands and feedback from smooth visual transitions is key in integration DataSea with a voice interface.

The front-end of DataSea is a query interpreter and visualization system, and on the back-end is a database and API (application programming interface). Briefly, one sees a 'Sea of Data', and after each of a series of commands, one sees increasingly relevant data more prominently.

DataSea nodes act something like nouns of a natural language, and DataSea commands something like verbs. Here are the principal steps involved in a user query:

Establish a point of view (either an existing node or a new, 'blank' one: if new, enter one or more reasonable values for broad, relevant terms of the query).

Invoke commands (such as 'show', 'back', 'similar', 'abstractions') followed by more words of the query.

Directly (e.g. 'more wordXXX') or indirectly (via commands such as 'group', 'similar', etc.) manipulate the presentation, progressively emphasizing information that is more relevant.

In a preferred embodiment, DataSea is a pure-Java application that can serve in a range of roles. It can view and control existing and legacy data such as email, documents, file directories and system utilities. It can ultimately serve as the principal UI to a system managing all data and system resources of a personal computer or workstation.

The natural ability of people to recognize visual patterns can be leveraged to convey information rapidly to the user. For instance, certain algorithms which depend on particular node and link configurations can render and position those nodes for rapid recognition. For example, if a target DN is surrounded by intermediate DNs which are themselves linked each to a distal AN, then those intermediate DNs are probably describing the target DN. The number of intermediates is then a measure of how much information is known about the target DN.

Its ability to gracefully reduce the complexity of the visual output means that a wireless hand-held client can be used to quickly browse and retrieve information from a remote server.

The simplicity of commands and accessibility of DataSea to the novice user lends itself to voice commands that can be used to navigate and control the display of DataSea.

The simplicity of DataSea's data structure allows easy acquisition and integration of legacy data into DataSea. Because new data is integrated with old, the acquisition of new data not only allows its retrieval by the user, but also enhances the user's retrieval of older data. Thus, as DataSea matures in its data content, queries are more robust to imprecise terms from the user. Since DataSea captures the information in the data and its structure from legacy databases, applications in DataSea can emulate legacy applications, while of course making this information available to broader use within DataSea.

While DataSea can emulate a RDBMS, without the complications of tables and foreign keys, the rich connections of DataSea and its ability to insert abstract nodes opens the way for neural-type processing. Learning-by-example is one example of that new capability. Learning-by-example refers to adjusting mag and CS values by 'voting' (via 'more' or 'less', for example) on DNs, without relying on ANs. This selects DNs which the user especially likes or dislikes. Applying commands to DNs (such as files or URLs) changes not only the mag of each DN, but changes the CS and mag in its neighborhood, typically spreading through related ANs, thereby changing the mag of other DNs in the neighborhood, i.e., having similar qualities as the DNs that the user liked. A different point of view applied to DataSea, by virtue of different connections and connection strengths, changes the presentation of data as fundamentally as changing the database design in a relational database, but much more easily.

DataSea can be used to perform simple web-history viewing, data mining, and can be used as the principal Desktop UI for a computer showing all of the computer resources.

Legacy Data and Network Tools:

Viewing domains such as file systems, web history or HTML documents and computer networks are obvious uses of DataSea and are early targets of DataSea. Applied to a web browser, the text of links to the current URL can be retrieved and parsed into DataSea, in effect pre-digesting it for the user.

Voice Interface to Wireless Handheld Devices:

The GUI (Graphical User Interface) of DataSea is important, but the underlying structure of DataSea queries and input methods are curiously appropriate for voice and natural language interfacing. Since queries, input and control of DataSea rely on simple words DataSea, current voice recognition software can be used instead of text input, and would significantly improve the uniqueness and general usability of DataSea. No other UI uses voice or is as appropriate for voice control. Since the results of many queries may be a short answer, voice generation is an appropriate output method, in addition to or instead of graphic output. For instance, the query 'show John Smith and address' is precise enough to generate one value significantly stronger than others, and therefore amenable to a programmatic decision for selecting which results to submit to voice output. In this way, voice can be a complete communications method, opening the door to remote access via telephone or wireless device.

Portal:

Another opportunity involves selling server time for web searches, giving away client software initially. A typical interaction might involve throwing a number of search terms, asking for a display of abstraction categories or examples of URL's followed by the user judging prominent nodes, repeating as the search narrows.

Data Warehousing:

DataSea's data structure and tools lend themselves naturally to data warehousing and mining, each with an estimated worldwide budget in 1999 of nearly $2 billion. DataSea intrinsically provides data mining and warehouse support. DataSea supports any type of data without specifying in advance the fields or tables to use. This is good for arbitrary user input, such as free-form notes, or machine-generated input, such as received data from automated test-equipment. DataSea therefore is a completely flexible data warehouse.

Data Mining:

Data mining is supported by DataSea's ability to reorganize any data based on user-defined point of views, the ability to link any and all data, and the ability to store the processing of data and applications into DataSea itself.

Principal UI:

DataSea can serve as the Desktop screen, the principal interface to all system services, independent of operating system. It can do this on demand, without locking the user into a particular operating system.

Architecture of Datasea

Java Objects

The most used variables of object Node are Name, dist, mag and links[ ];.

Definitions:

```
global variables: Node PointOfView_node, lastNode;
Class Node extends Object { // Important variables in
    each node
    Object Data; // contains any computer representation
        of data, and includes get and set methods
    int dist; // the number of links from this node to
        the POV or another node.
    int tdist; // a temporary version of 'dist' used in
        calculating the minimum number of links from a
        node to other nodes.
    double mag, x,y,z; // x is the 'x' position in the
        DataSea coordinate system
    double px, py, pz; // px is pressure in x direction
        resulting from positioning routines
```

-continued

```
    double potentiation; // used to make node more
        sensitive to effects such as magnify
    TimeStamp potentiationTS; // time of last
        potentiation, used to degrade effect of
        potentiation as time passes
    String Desc, Type; // used to describe the node. Type
        is typically DN, AN, Event
    LinkObj links [ ];
}
Class DataObj extends Object { // contains any
    computer representation of data, and includes get and
    set Methods
    String s;
    ...
    getDataAsString( ).
    ...
}
Class LinkObj extends Object {
    Node linked_node;
    Double CS;
    TimeStamp TS;
    String Desc, Type; // used to describe the link, may
        refer to the source of the link, whether its an
        alias or not. usually set by the creator of the
        link.
}
Class VRObj extends Object { // VR stands for Virtual
    Reality
    double VRx, VRy, VRz; // relative positions in VR
        space, typically positions offsets from another
        node identified by recursive calling sequence or
        information contained in this or in related
        nodes or links.
    boolean VRlocal, VRenabled;
    VRShape Shape; // data and methods to render semi-
        realistically, for Virtual Reality presentation.
}
Class NameListObj extends Object {
// Acts as an index for all nodes.
// Vector, hashtable or other implementation of all
    nodes for rapid access based on name and or
    other fields such as TimeStamp and Desc
// METHODS
Node getNodeNamed(String s) { };
}
```

Examples of Subroutines Used in Preferred Embodiment

Node.getChildCount( ) // return the count of distal links
Node.getChild (int i) // returns $i^{th}$ link with distance>Node's distance
Node.getParent( )
Node.getNodeNamed (String s) // finds a node named 's' anywhere
Node.getNearbyNodeNamed (String s, int max_distance, String type) // finds a node named 's' within 'max_distance' links of Node, having Type 'type'.
Node.getConceptualDistanceTo (String s, int max_distance, String type) // returns result which is a function of distance to the target_node named 's', Type 'type' and the CS's to and including the target_node, and the mag of target_node.
Node.get/setNodeLinkedToAN (String an_name, Data data value) get or set the value of the node between 'this' and AN(name)
set_dist(Node starting_node) // recurses, calculates and sets Node.dist by finding the shortest route to each node by recursing from starting_node
set POV(Node target_node) //{set_dist(target_node); POV=target_node;}
show (String name) {create_POV( ); POV.link(getNodeNamed(string)); set_dist(POV);}

Examples of User Commands

Most methods have three versions of arguments: ( ) (String s), and (Node n1, Node n2 . . . ). If null, then lastNode is used, if String, then matching nodes are looked for: both pass one or more nodes to the third version which takes explicit Nodes.

Show( ) (Node target) // link target to point of view, create point of view if necessary Abs( ) (Node target) // magnify distal ANs showing category of target (the AN is in a sense a category). An AN related to the target by two or more intermediate ANs will accumulate magnification via those intermediates. Follow distal paths, magnifying ANs along the way. Any AN along multiple distal paths will be magnified multiple times. Thus higher level ANs are emphasized.

Back (Node target) // working proximally from target, increase mag of all until point of view is reached And (Node target_1, target_2) // potentiate neighborhood of target_1, then raise mag in neighborhood of target_2 if potentiated More (Node target) // raise mag in neighborhood of target, reducing the amount of change in mag as a function of spread mode: e.g. proportional to the distance or a constant up to some threshold distance.

Potentiate(Node target) // similar to More( ), but the value of the variable potentiated is increased rather than the variable mag, and the potentiation TimeStamp ('potentiationTS') is updated and used to tell other routines when this was last potentiated. Typically other routines will reduce their modifications to variables as the elapsed time (currentTimeStamp-potentiationTS) increases.

Sim (Node target) // indicates DNs which are similar to target based on their connections to ANs or other nodes. Similar to abs( ) but DNs on multiple paths are emphasized. Note: 'abs' and 'sim' use similar mechanisms traversing nodes. One emphasizes ANs resulting in abstracting the categories of the starting point, and the other emphasizes DNs thereby showing nodes that are similar to the starting point.

Group(Node start, int target_level) {// group DNs around ANs which characterize them. From point of view, go distally until child.dist==target_level. If child is an AN, then force parent.X=child.X which clusters the data nodes between the start and the child abstract node onto the abstract node. Wait a second or so, letting the data nodes spread apart some, and repeat for (target_level--).

Recent( ) // magnify nodes with recent TimeStamps.

The usage "Recent 1 hour" sets the value "1 hr" into the DN between DN(now) and AN(range).

where "range x=y" means:
(DN(now).getDNhavingANnamed(range)).setData("1 hour")

We next describe some of the above-mentioned commands in another way, and we describe other commands:

Data Manipulation Commands

Show links specific keyword to a point of view, zooms on it and emphasizes it and its neighbors.

Group Starting from the point of view, secondary (2°) data nodes spread distal magnify to directly connected abstract nodes, and set the secondary nodes position next to the largest directly connected abstract node, thereby grouping them.

Link|unlink links specific nodes to a point of view or other nodes.

More|Less emphasizes specific keywords given by the user and their immediate neighbors.

Abs(tractions) emphasizes abstract nodes related to a data node, higher levels of abstractions being dominant initially.

Sim(ilarities) emphasizes data nodes which are similar to a selected data node.

AND emphasizes nodes near two or more selected nodes, similar to the boolean 'and' function, although as with most aspects of DataSea, the result is not a binary decision. The non-linearity of the AND operation is adjustable, bringing in more or less of the neighbors. A highly non-linear mechanism akin to neural 'potentiation' can also be used, which can give very precise selectivity to the process of adjusting connection strengths and magnitudes.

SS Spreadsheet simulation, given one data node, this presents related data nodes in tabular form with their principal abstract nodes as column-headers. Useful for tabular output.

TL A fast synonym for "zoom TimeLine", "more now". Now' is a node updated automatically with the current time, linked to the TimeLine and nodes containing preferences for concepts such as 'recent'.

Viewing Commands

Back emphasizes data nodes going backwards from a distant abstract node to the point of view.

Zoom Centers and magnifies the screen image appropriately on a node or group of nodes Supported Applications Mail sends email to an address that is either explicitly selected, or begins a dialogue to choose one or more addresses based on their proximity to the current point of view. This is an example of a command which uses information from neighbor-values such as type and distance to make decisions. Uncertainty is resolved by the user who selects from a list of candidates proposed by the application.

Simple Tabular Presentation (Spread-sheet format)

Activate runs the most appropriate program on a selected data node. Exactly which program is easily determined and changed if desired, since it is a functional node connected to the selected data node, and is thus viewable through normal DataSea techniques.

Input takes text given by the user, parses, time-stamps and stores it into DataSea. A typical example of this would be ad hoc notes, such as 'phone-call from Bob about printer problem', or 'phone-number of Mary Smith is 845-1234'.

Example Applications

Mail (Node target) From the target node, search the neighborhood for AN("name"), and use the DN proximal to it. From that DN, search for a DN connected to AN("address"). Similar for other ANs of use to a mail program.

Notes Entire note is made into a DN, words become ANs with links to the parent DN.

The special syntax
"word1=word2"
creates AN(word1) linked to DN(word2).

SSheet(Node target) A tabular representation of data and column headers of linked ANs in the neighborhood of target_node is built:

Collect all DNs linked to target. These represent one row of tabular presentation. Label these with column headers of the names of their directly linked, distal ANs. Each subsequent row is built from DNs linked to ANs and each other.

Set all of the VR position variables to appear in DataSea display as tabular format when in VRmode.

Phone(Node target) looks in the neighborhood of target for a DN linked to AN("phone number")

Dir(Node target) is a special case of SSheet, and looks specifically for directory-related information.

Data Acquisition

Any application can store new data into DataSea, e.g. the applications Notes and Email.

Custom programs can translate legacy formats into DataSea linked nodes, e.g. to load information about a file system, the names of files and directories are stored into a tree representation first, then suffix and name can be used to create ANs, then content can be analyzed, e.g. by putting it through the Notes processor.

A RDB (Relational Database) would be loaded by storing the names of databases, tables and columns into ANs, and then values into DNs and keys into links. All these would be linked appropriately: e.g. table name linked to column names linked to all DNs having the values in those columns.

Web indices and browser histories can be stored.

System resources can be represented in DataSea.

A dictionary or synonym list can be loaded. The Type and Desc of links between synonyms or nodes with similar meaning are set. E.g. Type="synonym", Desc="from Webster's $10^{th}$ Ed."

The user need not know about the data structure, such as database tables and their entity relationships in a relational database, or the directory structure of a file system. Nor does the user need to parameterize and decide how to store data, but may rather simply stuff it into DataSea. DataSea will parse the textual data and create links to representing abstract nodes. Abstract nodes are typically single words representing simple or complex concepts, and are linked to data nodes related to them. These nodes typically are massively linked.

DataSea is accessible from external programs via its API. More interestingly though, Java code may be stored into a node, fully integrating data and methods. The Java code can then act from within DataSea, for instance modifying the rendering of objects or analyzing data and creating new nodes and links.

The sequence of positioning and rendering flows through the network of nodes from the POV distally. Typically an application will start from one node, specified by name, pointing device or other means, and will search the neighborhood of that node for certain relationships or values and types. For example, invoking "Phone Jim" can find the nearest DN(Jim), then present the nearest DN which is linked to AN("phone number"). Thus commands like "Phone emergency" can work since 'emergency' can be linked to '911' which can have a large default CS which allows it to dominate, and "Phone 123 Main St" can work since the address "123 Main St" can be linked to a phone number through a DN of a person's name.

In addition to the DataSea commands such as show, abs and sim, new applications can be written to extend the base command set of DataSea.

All nodes have the capacity to store a VRObject which contains position and rendering information. It includes a triplet of numbers describing the relative position of a child to its parent, if the rendering mode of DataSea is set to 'VRmode'.

Applications in Datasea: How they Differ from Typical Applications Outside of Datasea Typically computer applications use or set values at specific locations of memory and may or may not check their values by some means or rules or comparisons.

DataSea looks for information by nearness (a fuzzy metric) and/or characteristics of its links and/or characteristics of nodes directly or indirectly linked and/or their values.

Besides looking for DNs which are linked to specific ANs, an application in DataSea can query the distance or conceptual distance from a node to one or more values (of values such as data values, TimeStamps or other parameters). Decisions can be based on complex functions of environment checking.

Visual Presentation

The visual tools of DataSea are based on a visual language which is completely different from today's standard GUI's and gives the user easier access to relevant data, and inhibits irrelevant data. DataSea can visually present large amounts of data and the relationships amongst them, emphasizing that which is relevant while keeping the larger context. The user sees exactly the data that is needed as well as related data, a form of look-ahead, albeit at lower resolution.

The data presentation changes as the user interacts with DataSea. Data moves smoothly from the background to the foreground, bringing it to the users' attention in response to the user. The gradual shift in visual states helps the user to understand what is happening as the query progresses.

The scene begins with a sea of objects representing nodes. Ordering of this sea begins as a result of commands to set a POV or by changing the mode to VRmode on some or all nodes. Typically one sees the sea of data in the background with the POV in the foreground and a TimeLine along an edge such as the bottom. Nodes move and change their appearance with interactions. These interactions can be with the user or with programs inside DataSea or externally.

The positions of nodes are changed by iterative calculations of forces on them, thus they move visibly between positions, rather than jumping suddenly. In this way changes in state, and thus appearance, can be followed by the user better than by sudden changes of appearance.

Visualization (in Accordance with the Invention)

Nodes are positioned dependent a set of pressures from sources, each pressure from a source (e.g. POV, parent, neighbors) being a function of that source's preferred position or distance between the child and the source, the child's mag, dist, etc. The optimum distance to point of view is proportional to dist/f(mag).

A node is stationary once these forces are balanced.

Rendering is also dependent on mag, dist, and mode.

Point of view is either a new temporary node set at a specific position on screen, or is an existing node.

Visual Presentation

The visual tools of DataSea are based on a visual language which is completely different from today's standard GUI's and gives the user easier access to relevant data, and inhibits irrelevant data. DataSea can visually present large amounts of data and the relationships amongst them, emphasizing that which is relevant while keeping the larger context. The user sees exactly the data that is needed as well as related data, a form of look-ahead, albeit at lower resolution.

The data presentation changes as the user interacts with DataSea. Data moves smoothly from the background to the foreground, bringing it to the users' attention in response to the user. The gradual shift in visual states helps the user to understand what is happening as the query progresses. For example, compare the ease of understanding either of these two scenarios: First, watching five animated objects, which represent five words in alphabetical order, reverse their order, representing reverse-alphabetical ordering: Second, watching five words on a line change from ascending alphabetical order to descending. In the first case, reversal is apparent.

In the second, the simple operation of reversal is far less apparent: seeing the reversal requires re-analyzing the words and then trying out one or more possible explanations. In DataSea, nodes cluster and move individually and in groups in response to queries. Internal parameters inherent in each node and link change in response to queries. These internal parameters are mapped to visual behavior and appearances, such as size, position, color and shape.

These visual cues are used to enhance certain nodes or groups of nodes and their links. The internal parameters are changed by (typically recursive) commands that start at one node and spread through links to others. Commands adjust connection strength and magnitude of nodes based on their programmed algorithms and local node and link information, such as node type and the distance from the point of view.

The point of view distance parameters are associated with each node and are functions of the shortest path from that node to the point of view. Recursive commands are self-terminating: typically but not always acting distal to the point of view (where the value of the next nodes distance is greater than or equal to the current distance) and often but not always producing less effect further away from the point of view.

The initial appearance of the GUI is a pseudo-3D view of:
- a backdrop containing the entire data set: The representations here are relatively stable, and provide an orienting reference for the user;
- a timeline along the bottom of the backdrop and
- a foreground region in which the user creates Points of Views (point of views) and into which data are brought forward from the backdrop. The dimension from back to front essentially represents the degree of customization of data presented to the user.

A new query is begun by entering words, similar to a web-search, or manipulating regions of the background with the mouse. One or more data nodes are directly 'hit', increasing their magnitude, and secondary nodes (those distal to a primary) and their links are affected: exactly how depends on the spread mode of the operation. Nearness to the point of view is usually a function of link-distance and magnitude, but other methods are possible, e.g. link-distance alone which display data in a simple hierarchical set of 'levels'. Details of nodes are normally suppressed, but with the 'magnifier mode' turned on, any node under the cursor presents more information. Another mode is 'warp mode', which acts like a large magnifying lens on a region of the screen. This is similar to hyperbolic viewing of networks of nodes.

Which nodes are enhanced depends on the command and the spread mode, which is the way in which it traverses the linked nodes. The simplest spread mode is 'radial': this modifies the node at distance n+1 based on the strongest node directly connected to it of distance n, in effect being influenced by the node which is on the strongest path back to the point of view. Another spread-mode is 'sum', which adds up all the contributions of nodes of distance n to directly connected nodes of distance n+1. In 'sum' mode, a single data node distal to a large number of nodes will sum all their contributions. This is especially useful in the Similarity and Abstractions operations.

If a specific node is specified in the query, it is enhanced by, for instance, growing in size and moving towards the point of view from the background blur of nodes. If an operation of an abstraction type is used, the abstract nodes are enhanced. The relative positioning of higher or lower levels of abstraction depends on the specific command. If an operation of a similarity type is used, data nodes predominate by approaching the point of view and by being enhanced.

Rather than connecting the hits immediately and directly to the point of view, abstract-nodes in common are first drawn near the point of view. These more abstract nodes are then followed by more detailed ones receding back to the backdrop, positioned to give the sense of their being pulled out of the DataSea. Qualities like time since an event, or distance to one or more chosen abstract nodes can act as a secondary force, or wind, acting to influence the position of nodes along one of the 3 dimensions of the visualization.

Links

Data in DataSea is heavily linked without restrictions on what can be linked. DataSea solves the 'cobweb' visual problem by establishing a point of view for the users' queries. The problem of following links that are loops is solved by calculating, on the fly, the shortest number of links from the point of view to the nodes. This turns a series of self-referencing loops into a temporary hierarchy, based on the current point of view.

The user can browse raw data in DataSea, but meaningful structure comes from the interaction between the point of view and raw data. This is analogous to the quantum-physics effect of forcing a wave function into a specific physical state by applying an observation to the wave function: interaction with the user that forces data into its useful, visible state.

A point of view is one form of an abstract node. Once the user finishes a query, the point of view that has been created can be absorbed into DataSea and used later, a form of 'checkpoint' used in calculations.

Links can occur rather mindlessly, for instance simply by association to part or all of an inputted document, in a way which captures relationships, for instance field definitions from legacy databases, or semantic meaning from, for example, some level of natural language processing.

Postprocessing inside DataSea creates abstract nodes.

These represent abstractions of the data inside DataSea, representing concepts or the results of analysis. A 'mature' DataSea will contain a large proportion of these abstract nodes.

Each event which links data within DataSea stores a link ID along with it. Thus any two nodes can be linked together more than once, each link having a different ID to differentiate the context of their being linked. A single link ID can be used between many nodes, as long as that particular subset of nodes has a meaningful context. This context is stored in an abstract node which, linked of course to the subset with that link ID, and contains the reason for the links.

Data

Data is user-defined and customizable: whatever the user puts into DataSea, it merely needs to be in a computer representation. Data is held inside so-called 'nodes', which may be linked together. A data-node can be a specific value, text such as a web page or free-form entry, or an object representing something as complex as a virtual-reality view of a manufacturing facility. Text in any language is broken up into words and stored. All of the different forms of data share identical mechanisms of storage, linkage, search, presentation and access. The database contains highly linked data but differs in significant ways from RDBMS's (relational database management systems), including the ability to create links between any data and the elimination of structured tables. Rather than using pre-defined fields to capture relationships, DataSea uses nodes with appropriate links. As new data is introduced and linked to the existing nodes, alternate paths are created between points. This allows data to be found which contains no keywords contained in the query, relying on associations contained in the new data. A simple example would be loading a dictionary into DataSea: there are few related concepts that are not linked through only even two or three definitions of either. Thus, a user may enter a query containing no keywords of a document and be presented with that document, albeit emphasized less than documents that contain more direct links to the query terms. AI or manual 'digestion' of information and linkage to abstract concepts is of course possible, as is done by those who compile databases for search engines today.

The user need not know about the data structure, such as database tables and their entity relationships in a relational database, or the directory structure of a file system. Nor does the user need to parameterize and decide how to store data, but may rather simply stuff it into DataSea. DataSea will parse the textual data and create links to representing abstract nodes. Abstract nodes are typically single words representing simple or complex concepts, and are linked to data nodes related to them. These nodes typically are massively linked.

DataSea is accessible from external programs via its API. More interestingly though, Java code may be stored into a node, fully integrating data and methods. The Java code can then act from within DataSea, for instance modifying the rendering of objects or analyzing data and creating new nodes and links.

Applications

A fully integrated application in DataSea uses the DataSea linkage and VR mechanisms to provide the functionality of typical window/menu systems. The program of the application is stored in a DataSea application node.

The typical steps taken by DataSea applications include:
the neighborhood of the target node is searched by the application for application-specific data requirements
New formatting nodes are created (eg. A 'page' representing the template for a letter)
Links are made to data nodes and their VR positions are set relative to the formatting nodes.

VR Mechanisms

All nodes have the capacity to store a 3-D vector called a 'VR-position'. This is a triplet of numbers describing the relative position of a child to its parent, if the rendering mode of DataSea is set to 'VR-mode'. Any child having non-zero a VR-position variable will position itself relative to the calling parent based on the VR-position values.

Essential Internal Elements of Datasea

Figure 3:
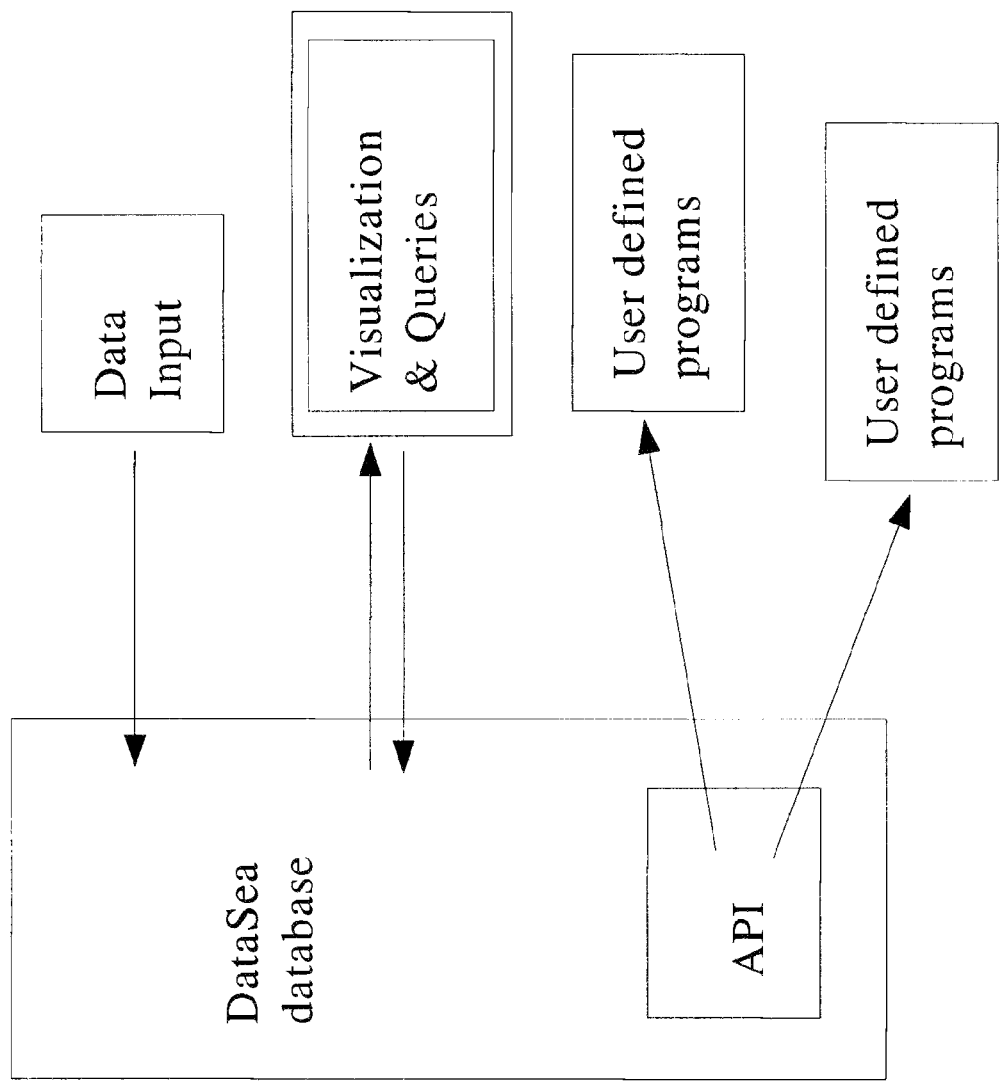
FIG. 3 is a block diagram of an embodiment of the invention.

In a preferred implementation, DataSea is a pure-Java application. Once loaded, user-defined data-nodes and links are used to visualize information from a range of sources in an interactive or programmatic way. Data-node sources can be email, web sites, databases or whatever is required. FIG. 3 is a block diagram of an embodiment of the invention. All data is contained in objects called nodes. Information describing the data is held in the data-node. A complex data-node may be broken into smaller ones. A data-node has a set of standard fields describing itself and any number of links to other data-nodes.

The DataSea database is a highly linked structure of nodes. A link contains information describing itself and how it relates the linked data-nodes. It therefore contains semantic information, adding a new dimension to interactive or programmed processing of data. That is, DataSea supports not just parametric searches (which find the values at certain storage locations specified by parameters) or content-based analysis (which find particular values and their relations anywhere in the database), but the meaning of a collection of nodes. An example of this could be a link with the description "located near" relating a computer with a person's name.

Processing of data occurs not only on values of certain parameters, but on any value, independent of what it is describing. For instance, one may search for all information related to an individual's name without specifying which table and column of the database to search, and in which tables and columns to look for foreign keys.

Applications can run inside DataSea, in fact these applications are themselves held inside a node. Current applications such as automatic report generators and data formatters, know which pre-defined data fields to place, just where, and how to order the values. This functionality is served by DataSea's mechanism of node and link descriptors, which can act as the column names of RDBMS's. The DataSea link description however also provides semantic information about those relationships.

Objects are positioned and rendered strongly dependent on their content and their links. That is, features of the rendering of nodes and the relative positions of nodes depend on content and links.

Thus, DataSea is unique because the presentation is strongly dependent on the data itself.

Usage Scenario

Below is a scenario of events with comparisons between two different application approaches: The user routinely stores information and calls it up later when faced with a decision as to repair a new printer or buy an old one. This example shows the simplicity and time saved with DataSea. It compares:

1) DataSea, and
2) A mix of applications consisting of "Outlook Express", "Excel", and "Internet Explorer" in a Microsoft Office Suit, along with two other applications, "Tracker", a call-tracking application and a database front-end application called DB-Front-End here. The numbers of seconds in parentheses following these two methods are estimates of time needed by the methods, in addition to the event itself.

Event: The user receives email from a friend who mentions her new H.P. printer

Office Suite: email is stored in Outlook Express.

DataSea: email headers and text are automatically stuffed into DataSea.

Event: The user surfs the web and finds advertisement for HP Printer

Office Suite: Internet Explorer saves the non-overlapping history of URLs temporarily, and relies on the user to bookmark special URLs, and put them in the tree hierarchy defined by the user.

DataSea: with links to DataSea from the browser, each URL visited is stored into DataSea.

Event: The user gets a phone call and makes a note to himself that repairman Bob Smith says that printer A will cost $300 to repair, and that it is in Joe Baker's office.

Office Suite: The user opens the call tracking program 'Tracker' and fills in the fields prompted by the wizard, including the note text "Repairman Bob Smith called . . . ".

To store the location of Printer A in a company-wide database, the user invokes the database editing application DB-Front-End, selects appropriate view (e.g. Machine_View), searches for 'Printer A', enters 'Joe Baker' for the column 'Location'.

DataSea: The text of the note is stuffed into DataSea, and explicitly enters: "(Printer A) (office=Joe Baker)". The information is parsed and time-stamped automatically.

Event: The user now wonders if he should replace printer A with a new one. He remembers seeing a reference in a recent email for an HP printer, and also an HP ad on the web, but can't remember exactly where he filed this information.

Office Suite: User opens Outlook Express, tries to recall the name of the email sender, possibly keywords to search and sets the time range to search (enlarged since an event 1 minute outside the range will be excluded) Immediately he sees messages focussed on one keyword. User skims header and text to decide if this is the correct message.

Then, user opens Internet Explorer and browses the names in the History list, trying to recall the context for each as he sees them, or tries to recall the name of the document corresponding to the right URL.

He then deduces which database stored procedure, table or view to use, opens the DB-Front-End application, enters 'Joe Baker' in the correct search field and sees "Printer A" in the Equipment column. He arranges the four windows from these applications for simultaneous viewing (Outlook, Explorer, Tracker, and DB-Front-End).

DataSea: User starts a point-of-view with the initial associative words "Joe Baker", Printer, email' and gives his guess of when this all occurred via mouse drag on the time-line. He sees several concept-nodes and some data-nodes. He then judges these by emphasizing/de-emphasizing particular ones, and sees email with appropriate links. He further judges them, adds the word "URL" to the point of view which results in the appropriate URL and data being pulled forward.

Example (Sales Pitch): Laptop Starts DataSea, Voice Interface Enabled.

User says 'show Mail' . . . mail nodes swell, abstract nodes visible.

User says 'show Files' 'Tax 97' brings directories forward and shows files.

User says 'show John Smith' which crates a point of view, linked to abstract node named "John Smith"

User says 'BMW' which shows Smith's "BMW 528 1985" by virtue of abstract node "car" linked to "BMW", "Ford".

User says 'show address' bringing "123 Main St." forward.

User says 'reset', then 'show address' and sees names and addresses of all entries.

User marks timeline over the past week, and says 'show printer and email and Hewlett Packard' which shows an abstract node "Printer" linked to email message about printers and a web page of HP printers User says 'input "John Smith telephone 848-1234" which creates a node holding the entire message, and parses it into smaller data nodes.

User says 'show John Smith'; one sees his telephone number.

To demonstrate abstract nodes and learning: have processed 50 URLs from 'cat' web search. See all 50 around the abstract nodes surrounding the point of view named 'show cat'. User deselects URLs not related to technical descriptions, the abstract nodes change, bringing forward URLs with more technical information.

Benefits
1) Immediate visualization of user-defined data.
2) Quick visual feedback on relevant data.
3) Less time required to interpret complex data.
4) Higher user productivity because DataSea is an intelligent organizer of data.
5) Non-technical user can view data in way they understand, not the way the database may be organized.
6) Reduces dependency on programmers.
7) Reduced bug-count and time for programmers.
8) Simpler usage model through single tool to manage and visualize information.
9) Time is saved in storing and retrieving information.
10) Databases can be joined automatically without custom code.
11) Points of view can themselves be stored into DataSea, storing interactions with the computer.
12) Queries and processing results can be stored into DataSea, and used as any other data.
13) DataSea learns by example: The user may search for data based on relationships to known data or high-level concepts. Judging can be applied to specific data, such as documents, or to concepts, resulting in 'learning by example': the mechanisms of positive and negative feedback to the system are the same.
14) New data is automatically integrated: New data can be entered and automatically integrated, allowing non-programmers to store data without adapting to the database.
15) Interoperability issues are moot: Programs can be integrated into DataSea as well as simple data. Since all links between nodes use the same mechanisms, any program has access to any data.
16) All data can be viewed while maintaining orientation and context: The user can always quickly orient themselves, sparing confusion because data is viewed from the point of view that the user has designated. Context is maintained by position and rendering cues, which indicate the sources of the data and their immediate relationships. The background with its clusters of data-nodes is relatively stable and familiar, and as data is pulled out from it towards the foreground point of view, the data's position is influenced more and more strongly by the criteria of the point of view and nodes connected strongly to it. The user 'judges' nodes: emphasizing a node will enlarge it and bring it to a more noticeable position.

Figure 4:
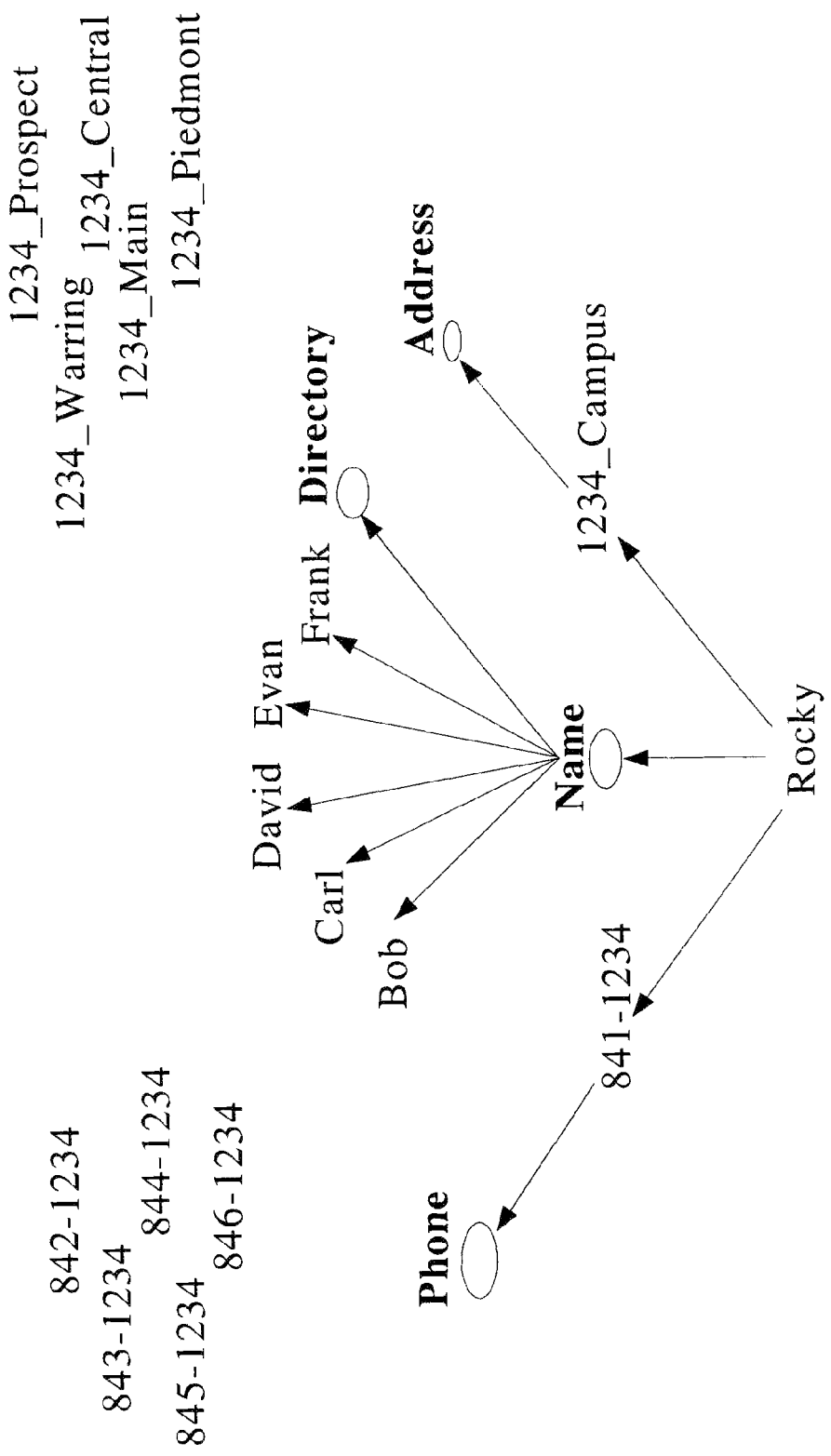

FIG. 4 is a screen-shot which shows the result of entering the simple command 'show rocky' ("rocky" representing the name of a user, who has previously entered data pertaining to himself into the system).

Figure 5:
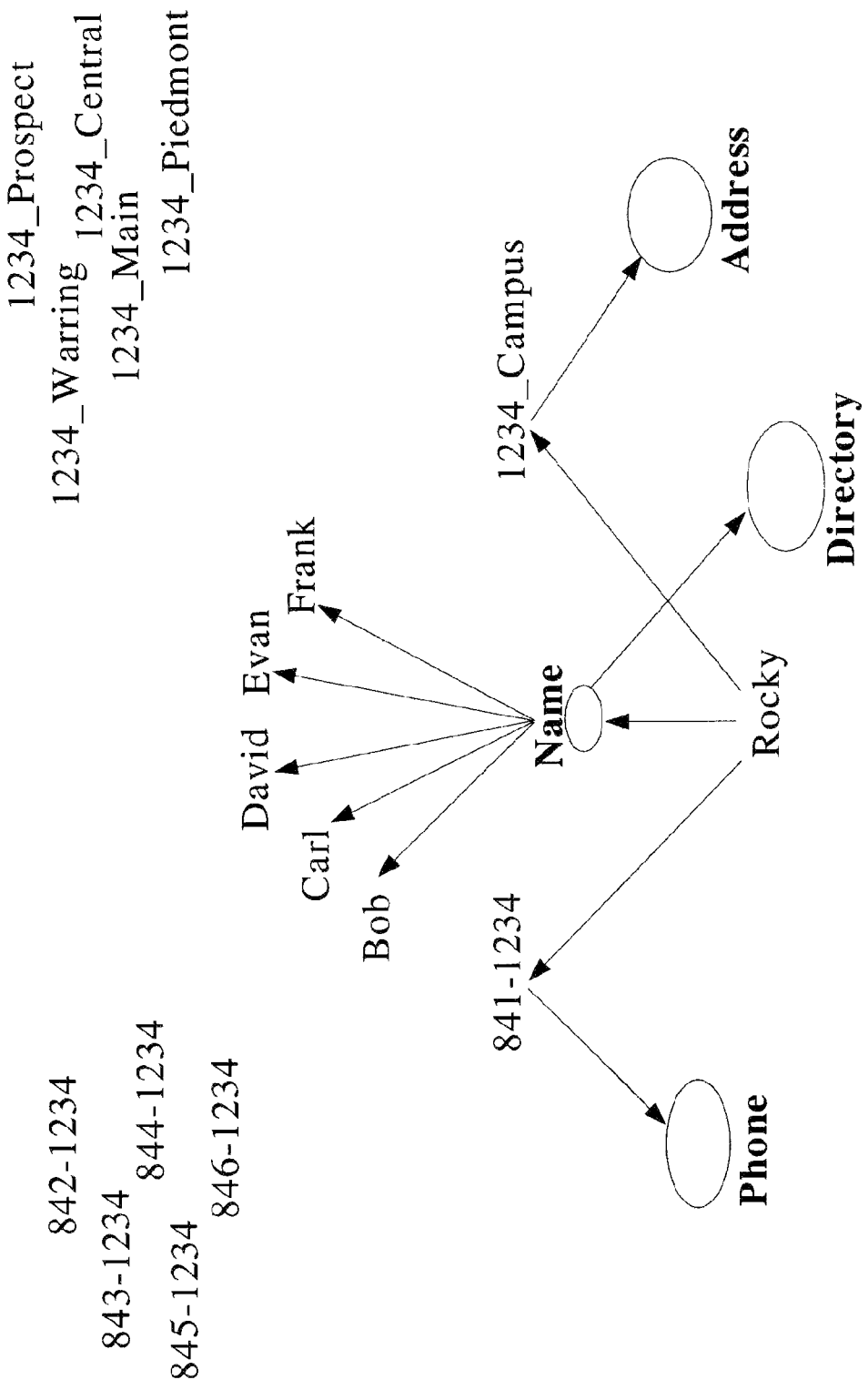

FIG. 5 is a screen-shot which shows the result of entering 'abs' (when the FIG. 4 display has been generated), bringing forward the abstract nodes which are distal to the data node 'Rocky'. Note the abstract node 'Directory', which, because it groups the abstract nodes 'phone' and 'address' and is thus at a higher level of abstraction, is positioned closer to the point of view than 'phone' and 'address' abstract nodes.

Figure 6:
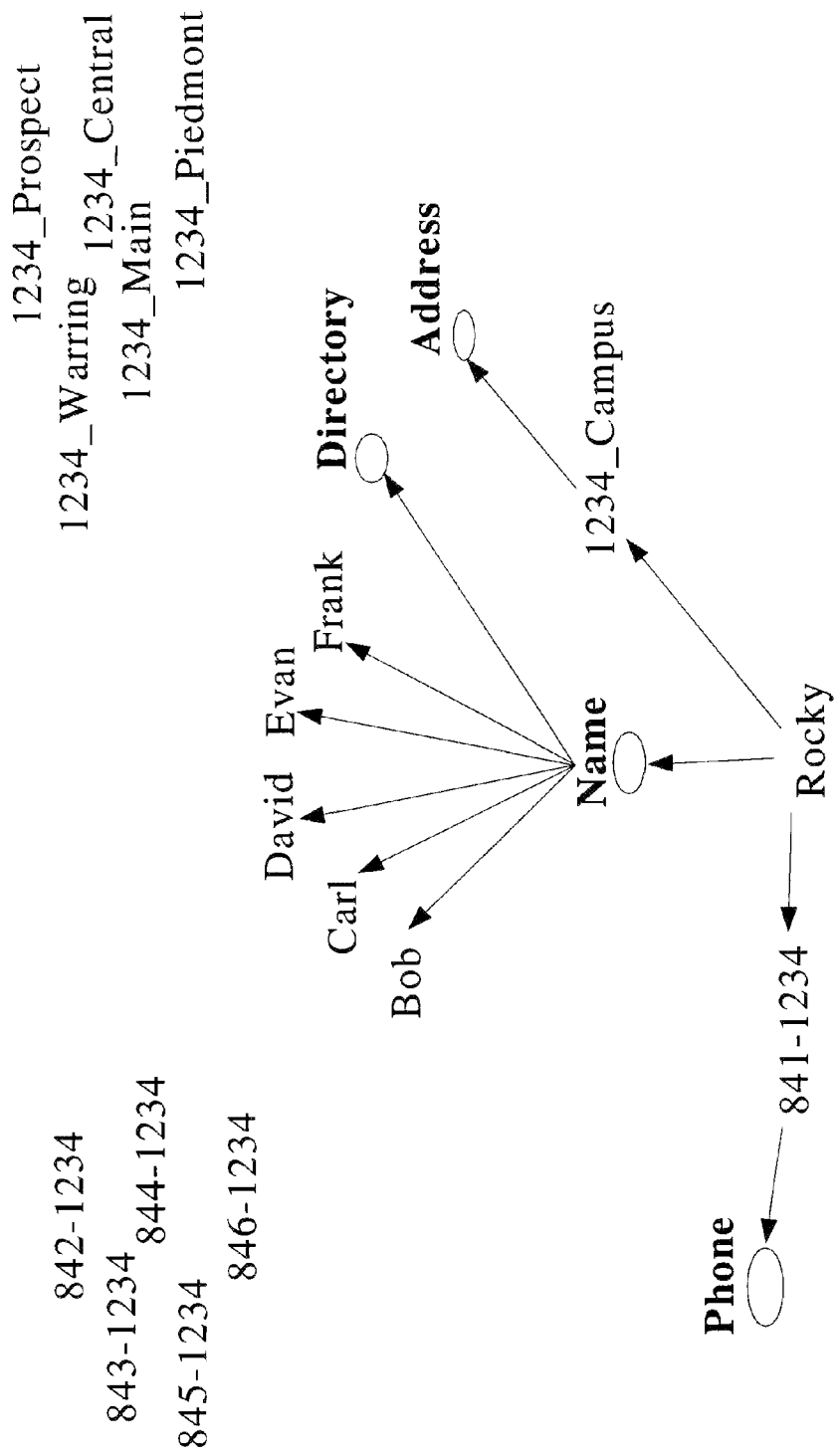

FIG. 6 is a screen-shot which shows the result of entering 'back phone' (when the FIG. 4 display has been generated), bringing the data node between the abstract node 'phone' and the target node 'Rocky' forward.

Figure 7:
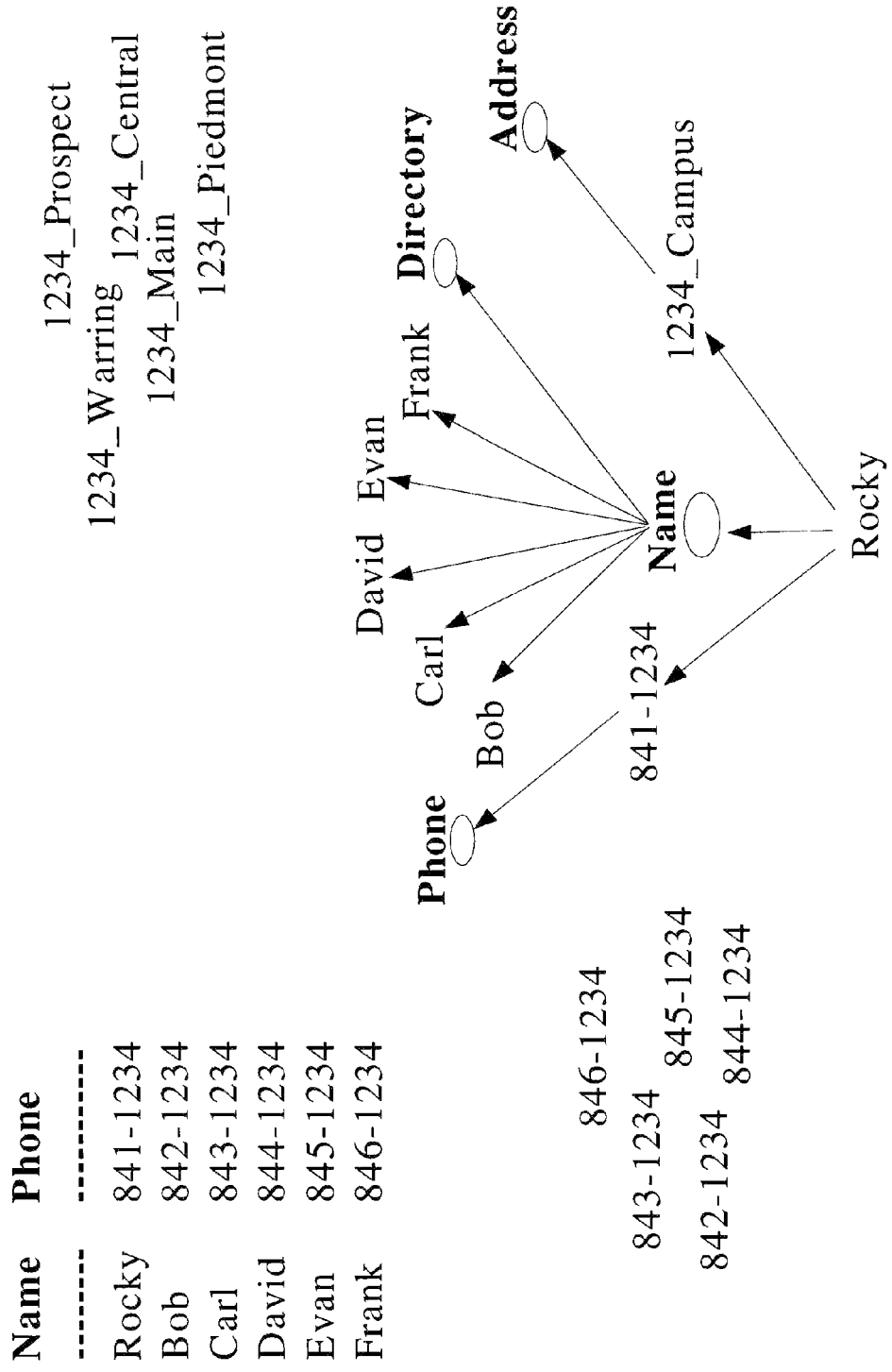

FIG. 7 is a screen-shot which shows the result of entering 'SS' (when the FIG. 4 display has been generated), which gives a simple 2-column spread-sheet based on the current target data node 'Rocky'.

Figure 8:
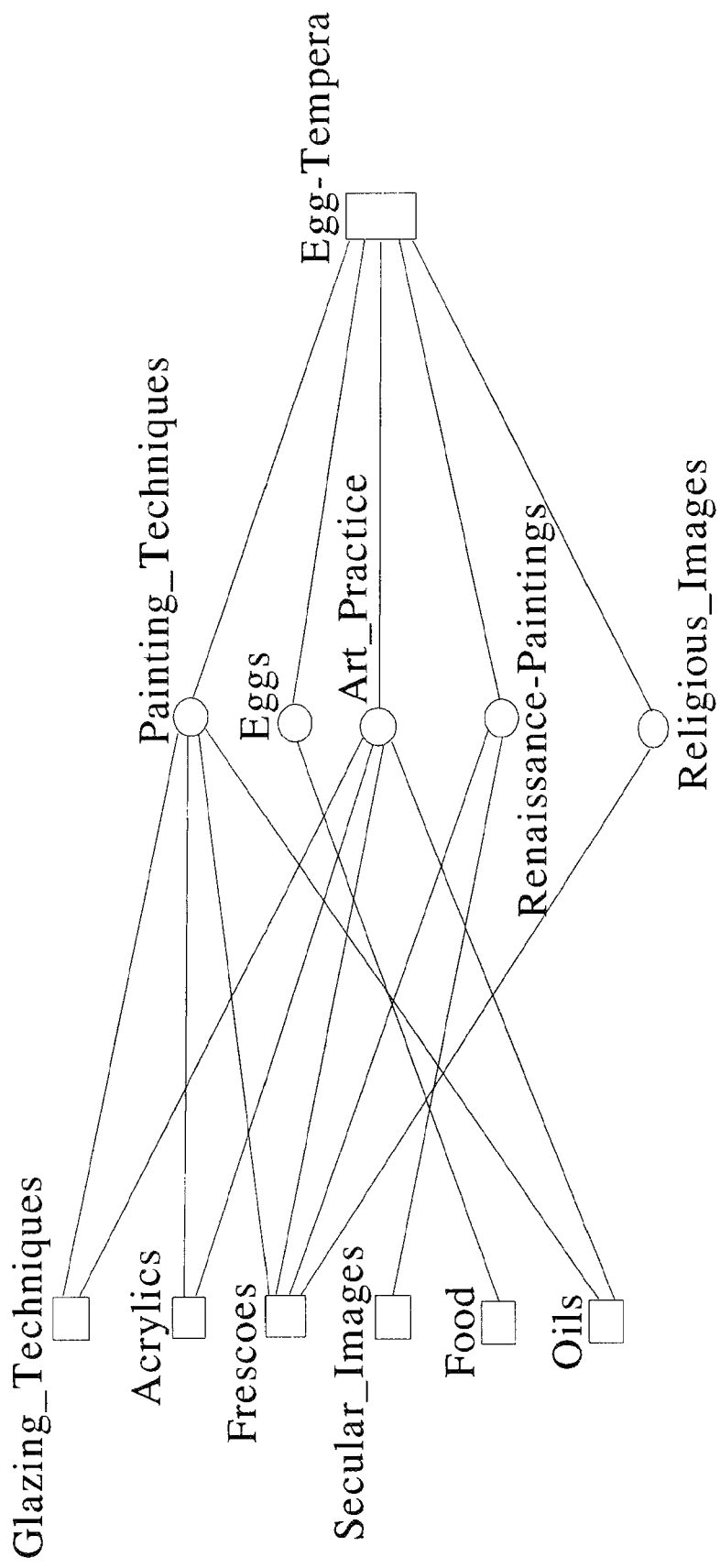
Figure 9:
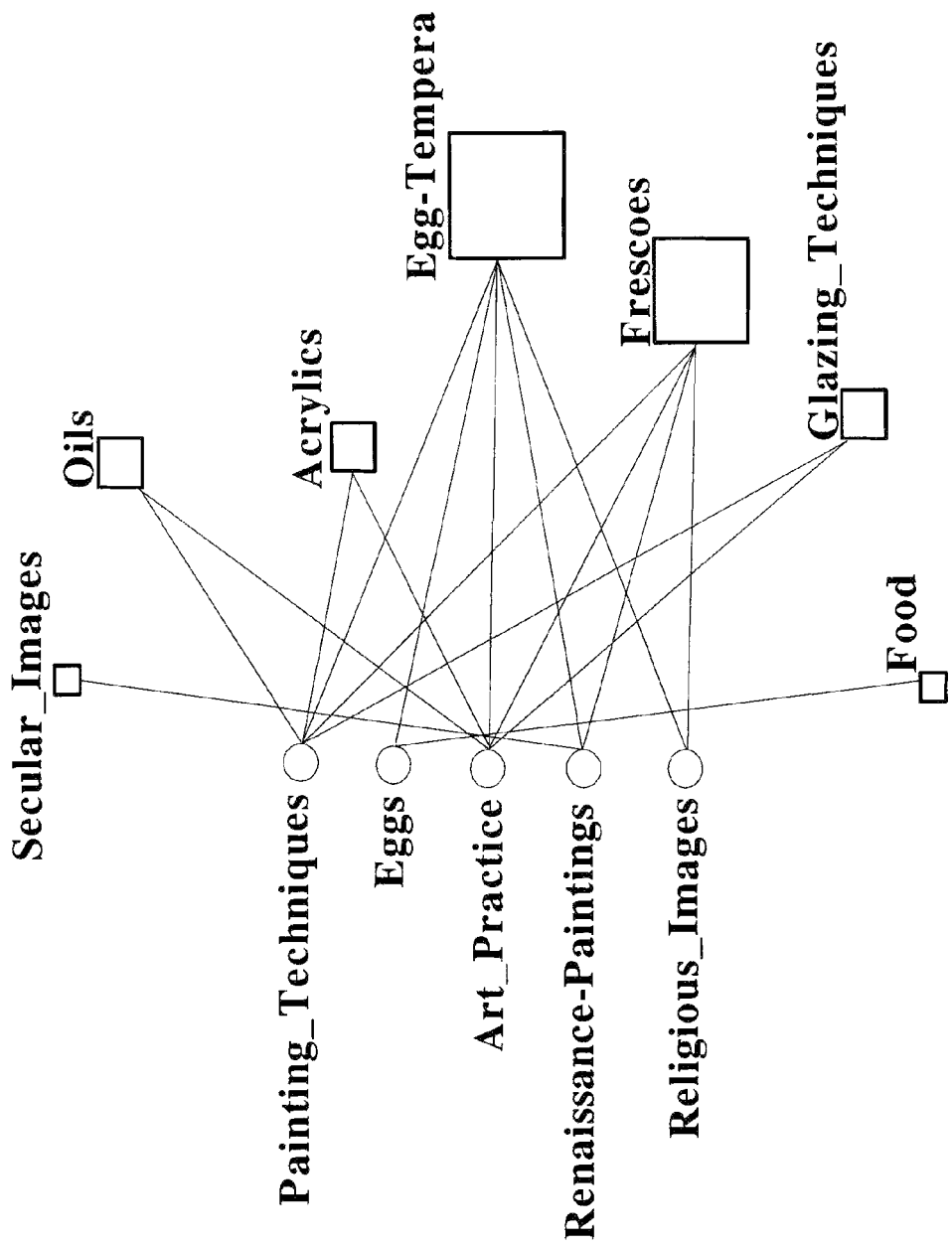

FIG. 8 is a screen-shot which shows the result of entering 'show egg-tempera'. It shows the primary abstract nodes. But what if we want to see some examples of data nodes which are similar to 'Egg-Tempera'? If so, one could enter the command 'show egg-tempera', 'similar', resulting in the screen-shot of FIG. 9. It is apparent by comparing FIG. 9 with FIG. 8 that the node "Frescoes" and nodes "Glazing techniques", "acrylics" and "oils" are brought forward in FIG. 9, near the target data node "Egg-Tempera".

Aspects of the invention include the following:
1. Methods of automatically creating a highly connected network of nodes containing data from computer-readable sources. Information contained in the structure of legacy databases is captured. All data can be integrated. The nodes are identical in structure, as are their links, differing only in their content.

2. Methods to interactively explore, access and visualize information in a highly connected network of nodes. These involve setting a point of view, linking some number of nodes directly to it and calculating individual link distances from all data nodes back to the point of view. This creates a hierarchical network amenable to visualization even though there may be cyclic loops in the links. This hierarchy may change whenever a link is added or deleted. Other internal parameters such as the connection strength of each link and the magnitude of each node are used in the visualization to calculate position and size of each node.

These methods:
A. emphasize relevant data throughout the query process;
B. are tolerant to imprecision and errors in queries. This ability improves as the data set grows;
C. allow access directly, or indirectly; retrieving relevant data containing none of the key-words used in the query;
D. allow finding data similar to known data, without specifying its characteristics;
E. give smooth changes in visual state rather than step-wise changes, and provide information to the user in the manner that the nodes move (speed and direction) and appear (size, color);
F. show available categories that a particular datum is a member of;
G. integrate virtual reality renderings when appropriate;

3. Method of breaking display space into an array of cells, having dimension one more than the dimension of the space displayed on the screen, the extra dimension being size. These are linked to nodes and used by the user interface to rapidly access individual or groups of nodes.

Additionally these methods:
A. are accessible to the naïve user;
B. allow emulation of applications such as relational databases and spreadsheets;
C. use a simple command and query syntax which is amenable to a voice interface;
D. use time efficiently: user spends time using commands that act directly on data, rather than time spent navigating a pull-down menu interface.
E. focus time spent on becoming expert on the data set, rather than the user interface.

Variations on the preferred embodiment include:

Variation 1: Voice integration. Front end routines take either keyboard input or voice input, submitting word strings from either to handler functions. Voice word 'go' acts as keyboard 'Enter'.

Variation 2: Client server, a wireless or wired client, display mode set to abbreviate early.

Self Diagnostics and Use as a Debugger:

DataSea can be used to visualize the DataSea program itself. Besides visualizing nodes which represent data for the user, as described elsewhere in this document, in so-called 'dataset nodes' the nodes that are visualized in DataSea can represent internal programming objects, methods or elements of DataSea itself (providing a sort of built-in debugger).

Code can be inserted into the program which will visualize each method's invocation and its modifications of user data.

DataSea separates the two tasks of modifying the values of node variables and rendering of those nodes. Thus DataSea can redraw the entire scene not only after traversing the linked nodes and re-calculating their internal parameters, but the entire scene can be re-drawn at any time during these calculations, even once every time a dataset-node variable such as 'mag' is changed.

Thus, a self-node can indicate to the user its own activity, by redrawing the entire scene normally and then highlighting itself, or drawing lines to a dataset-node or its elements that it is operating on.

For instance, if a user commands DataSea to increase the variable 'mag' of a node, the method which does that (e.g., 'spread( )') can draw a line from the self-node representing 'spread( )' to the dataset node it is modifying. A simple implementation could be as follows:

If the method spread( ) recursively calls the method spread_recursive( ), insert a conditional call to touch( ) after spread_recursive:

```
spread (Node node ) {
   // for all children of node
   // spread_recursive(child);
   // touch(node, child) }
``` where 'touch(Node caller, Node target)' will visualize the accessing and setting of variables in the target, where 'caller' is the spread( ) self-node and 'target' is the dataset node being operated on.

The method touch(Node caller, Node target) could be implemented as follows:

```
touch(Node caller, Node target) { // Show a line
   between caller and target nodes
   clear_screen( ); // clear the screen
   render_all( ); // render all the nodes normally
   draw_line_between_nodes ( caller, target ); // draw a
      line
   sleep (500); // pause so user can follow what is
      happening }.
```

Aspects of the invention include:

a method and apparatus for creating nodes containing data, linking the nodes into a network, setting parameters of the nodes (node variables, and maintaining information specific to each node, e.g. mag, CS, direction of the link (polarization). Each node preferably has a name associated with which it can be searched from a master list;

a method and apparatus using "context nodes" to modulate link connection strength (CS) and establish context for groups of nodes. For example, a method for associating a set of links and establishing a context node which can modulate the CS of those links thereby sensitizing or desensitizing them to further operations. The context node can also magnify the nodes linked by each link it modulates;

a method and apparatus for loading data from free-form notes. For example, a method of taking text input (text from user or application, or text resulting from voice translation) and establishing a set of linked nodes therefrom by:

creating a new node for the full text called the full-text-node;

discarding selected words (e.g. articles) linking the full-text-node to individual nodes representing each remaining word in the full text, creating new nodes as needed.

For another example, a method of converting tabular data, i.e., text organized into rows and columns, with column headings (or RDMBS data, with additional links for the keys of the RDBMS), into a set of linked nodes, in which:

each column heading is represented by an AN, the column-heading-AN each cell of data is represented by a DN links are established between each column-heading-AN (representing a particular column) and those nodes corresponding to the cells in that column links are established between those nodes corresponding to each cell in a row from the table.

For another example, a method of converting files from a computer file system or a set of files linked by HTML references into a set of linked nodes, in which:

DNs are established representing each directory or file;

links from each node are established to terms found in the file content, e.g., as is done in the parsing of notes. The procedure can filter the content looking for only certain tag values such as meta-tags or heading values (e.g. <H1> Title Here </H1> has "Title Here" as heading-level-1 in HTML)

Another set of links can be made to ANs representing the suffix of files, or such ANs can be used as ContextNodes for all links to those files.

For HTML files, links are to be established between nodes representing HTML files and other nodes representing HTML files that are referenced by the first HTML file.

For another example, a method of converting files from a computer file system, in which links are established between DNs representing file directory with DNs representing files or sub-directories in that directory;

a method and apparatus for defining a POV (either a particular node or a new node linked to a particular node);

a method and apparatus for defining distance (as a function of the number of links between nodes and the node type) and hierarchy from the POV and determining distal and proximal directions, in which: once a POV is set and distances calculated from it, a hierarchical 'tree' is defined from what was an arbitrarily complex cross-linked network of nodes. Thus, if any node 'x' has had its distance set by this routine, one is guaranteed to find a path from that node 'x' back to the POV by traveling on a path between nodes of ever-decreasing distance values;

a method and apparatus for retrieving data which is linked into a network of nodes interacting with the user to better present the desired data;.

a method for emphasizing nodes and paths by tracing backwards from a target node to a POV by following all links to nodes whereby the next node has magnitude less than that of the prior node. Emphasizing those nodes on the path(s) shows nodes 'between' the target and POV. By traveling backwards from the target node to the POV, there may be more than one node having a distance less than the target. This is fine, and if all paths backwards (with the requirement that they are consistently proximal) are emphasized it is fine. For example, with Bob being the POV, and traveling backwards from the node representing January 1999, all nodes such as notes and events related to Bob will be emphasized;

a method for assigning position to each node which is dependent on the node's parameter values, including distance, CS and magnitude. Rather than setting the node at the calculated position immediately, it moves there gradually thereby showing the transition between states. One way to do this is to calculate forces on a node which are related to the difference between the node's current position' and an ideal calculated position.

The ideal position depends on the positioning mode in effect:

a Relations Mode: Most suitable for narrow queries where we wish to see all the links between nodes in the target data set. Nodes fan out from their parent; the angle dependent on the number of children their parent has, their distance dependent either on (mag) or (1/mag); or a Levels Mode: Most suitable for broad queries where there are too many links between nodes in the target data set. Starting in the center of the screen, fanning out to the left dependent on their distance from the POV, ANs are rendered. Starting in the center and belonging to the right half of the screen are the DNs whose position moves further to the right the lower their mag;

a method and apparatus for visualizing data, by appearance on a screen. For example, a method of assigning visual emphasis (color, size) to each node dependent on the nodes distance, CS and magnitude.

Examples of operations performed on nodes of the inventive set of linked nodes (or on a sea of displayed representations of such nodes) include:

'ABS'(for characterizing and understanding the environment of nodes and their ANs): from a target node, traveling distally and upstream, find the first AN and emphasize it. This 'abstracts' the target node in terms of linked ANs. To abstract it at a higher level, go from those ANs to directly linked ANs which are both distal and upstream. This can continue to arbitrary level until we run out of nodes (realistically not very far, a handful of levels);

'XABS' (for emphasizing ANs from a group of nodes, those ANs not having been recently visited by query operations: emphasizing distally from these ANs will result in a relatively large number of DNs being modified. The user may find ANs which are obviously related or not related to their interest, and thereby significantly change the presented data set. Since these ANs haven't been used recently, we in effect triangulate the target data set from more vantage points. Determining categories which, when evaluated by the user as good or bad, have a large effect on narrowing the presented data set, that is helping the user find the target data set;

'SIM': a method of emphasizing (magnifying) nodes based on their similarity to a chosen node without specifying values of any node (using the 'sim' command which emphasizes DNs linked to any or all of the ANs which are linked to the chosen node(s));

"POTMAG": a method of modifying the variable Potentiation of a node, and using that value to influence the degree of change to the variable 'mag' from a subsequent operation. Thus, one operation on the first set of nodes may call Node1.setPotentiationValue( ) and a subsequent operation on the second set of nodes may set the value of Node1.mag based on Node1.getPotentiationValue( ) This 'primes' a set of nodes, and can operate approximately as a soft, or non-binary AND operation.

Another aspect of the invention is structuring of a set of linked nodes (a "network") including "application nodes" (sometimes referred to as applications). Applications are nodes containing code which get the information they operate on from traversing the network. E.g. an email node-application is linked to, or given a reference to, the node "Bob Smith", and upon being invoked (by the action function inherent in each node or otherwise) searches the neighborhood of the "Bob Smith" node for a DN linked to an AN representing email address. If more than one is found, the user is presented with the selection to choose from. Thus any node-application can be 'applied' to any node.

One aspect of the invention is a method of accessing data, wherein the data is structured as a set of linked nodes, and each of the nodes includes at least one link to another one of the nodes. The method includes the steps of:

preliminary to displaying representations of the nodes on a screen in a screen space having N dimensions, where N is an integer, dividing a display space having dimension N+1 into an array of cells, wherein the dimension of the display space includes a size dimension;

linking each of the nodes to at least one of the cells; and implementing a user interface which displays representations of at least some of the nodes on the screen having sizes determined by the cells to which said at least some of the nodes are linked, wherein the user interface rapidly accesses individual ones or groups of the nodes in response to selection of at least one of said representations.

What follows is a source code listing (in the Java programming language) of a computer program for programming a computer to implement an embodiment of the invention. In the listing (which consists of parts labeled "TL.java," "Timer.java," "ColorObj.java," "Link.java," "Mode.java," "Node.java," "Force.java," "GetURLInfo.java," "Input.java," "Populate.java," "GUI.java," "DataSea.java," "LinkObj.java," "VRObj.java," and "nsr.java"), the object "gui" of class "GUI" is the top-level object, and instantiates the object "datasea" of class "DataSea" (and other objects).

What is claimed is:

1. A method for constructing dynamic relationships between data for presentation on a display, comprising:
   accessing two or more data sources having two or more formats that are distinct in structure;
   parsing data from the two or more data sources to produce a plurality of nodes that contain data from the two or more data sources;
   initially generating links among the plurality of nodes, the links being generated based on data contained in the plurality of nodes, wherein the parsing of the data includes parsing textual data such that the textual data is used to define the generated links among the plurality of nodes without relying on data structure of database tables and entity relationships in a relational database to identify relationships among the plurality of nodes;
   setting a point of view from one of the nodes of the plurality of nodes, the setting of the point of view acting to create links to a reordering of certain ones of the plurality of nodes, in response to the setting of the point of view, to produce a representation from the set point of view, the representation positioning certain nodes having an increased magnitude at a closer link distance from the set point of view and nodes having a decreased magnitude at a farther link distance from the set point of view, wherein based on the set point of view, certain ones of the plurality of nodes are excluded from the representation and the created links for the set point of view include at least one link different from the initially generated links;
   generating visual data that illustrates the representation of the plurality of nodes from the set point of view; and
   providing the visual data for rendering on a display of a device, wherein the method is executed by a processor.

2. The method of claim 1, further comprising, receiving a request to,
   (i) select a different node to be set as a new point of view; or
   (ii) add a new node to be set as the new point of view, and in response to either (i) or (ii),
      (a) adjusting the ordering of the plurality of nodes for the new point of view; and
      (b) regenerating the visual data to provide a new representation of the plurality of nodes from the new point of view.

3. The method of claim 2, further comprising:
   repeating (a)-(b) each time a request for either (i) or (ii) is received.

4. The method of claim 2, wherein the request is made through a user interface (UI) rendered on the display of the device.

5. The method of claim 4, wherein the UI provides the representation in a textual or graphical format, or combination of textual and graphical formats, and provides controls for receiving the request for either (i) or (ii).

6. The method of claim 2, wherein the request is received from an external application or is received through a program that in part renders a user interface (UI) for illustrating the representation in a textual format or a textual and graphical format.

7. The method of claim 1, further comprising:
   receiving an application programming interface (API) request from one or more servers, the one or more servers setting the point of view to produce the representation.

8. The method of claim 1, wherein the data contained in the plurality of nodes includes one or more of, (a) information in data fields of the one or more data sources, (b) relationship information associated with the data fields, (c) instance field definitions from the one or more data sources, (d) semantic meanings found in the one or more data sources, (e) programming code, or (f) programming data.

9. The method of claim 1, wherein the reordering of the plurality of nodes includes calculating distances between the plurality of nodes relative to the node set as the point of view.

10. The method of claim 9, wherein the distances are represented by providing magnified emphasis on certain nodes relative to other nodes.

11. The method of claim 1, wherein setting the point of view is in response to a query that identifies selection of the one node from the plurality of nodes.

12. The method of claim 11, wherein the query is generated by a program that uses an application programming interface (API) to access the data in the plurality of nodes.

13. The method of claim 1, wherein the two or more data sources are updated with new data from time to time.

14. The method of claim 1, wherein certain nodes of the plurality of nodes include information regarding names of individual persons.

15. The method of claim 14, wherein the certain nodes that include information regarding names of individual persons have relationships to other nodes in the plurality of nodes and data associated with the named individual persons.

16. The method of claim 15, wherein the relationships between the nodes are graphically illustrated using the representation in a timeline.

17. The method of claim 16, wherein the graphical illustration of the representation is provided with visual transitions in response to changes in the set point of view.

18. The method of claim 17, wherein the representation changes in response to changes in the data in of the plurality of nodes, the changes in the data of the plurality of nodes occurring over time, or based on interactions with the plurality of nodes.

19. The method of claim 16, further comprising:
   providing the visual data to a plurality of devices that execute a plurality of applications, each of the plurality of devices having access to certain ones of the plurality of nodes stored on a server, the accessing being through an application programming interface (API), and the access through the API allowing each of the plurality of applications to present its own representation of the plurality of nodes from the set point of view of one node that is defined or associated with one of the applications.

20. The method of claim 19, wherein one or more of the applications are accessible through a browser or user interface of each of the plurality of devices.

21. The method of claim 1, further comprising,
   detecting new data being introduced and linked to the existing nodes; and
   creating alternate paths among the plurality of nodes.

22. The method of claim 1, wherein certain nodes of the plurality of nodes include information related to an individual's name and relationships between the plurality of nodes are identified in the representation, such that, changes in the set point of view change the representation, and changes in the data of the plurality of nodes change the representation, the changes in the data of the plurality of nodes occurring over time.

23. Computer readable code stored in non-transitory storage, the computer readable code having program instructions which, when executed by a processor, perform the following operations:

access two or more data sources having two or more formats that are distinct in structure;

parse data from the two or more data sources to produce a plurality of nodes that contain data from the two or more data sources;

initially generate links among the plurality of nodes, the links being generated based on data contained in the plurality of nodes, wherein the parsing of the data includes parsing textual data such that the textual data is used to define the generated links among the plurality of nodes without relying on data structure of database tables and entity relationships in a relational database to identify relationships among the plurality of nodes;

set a point of view from one of the nodes of the plurality of nodes, the setting of the point of view acting to create links to a reordering of certain ones of the plurality of nodes, in response to the setting of the point of view, to produce a representation from the set point of view, the representation positioning certain nodes having an increased magnitude at a closer link distance from the set point of view and nodes having a decreased magnitude at a farther link distance from the set point of view, wherein based on the set point of view, certain ones of the plurality of nodes are excluded from the representation and the created links for the set point of view include at least one link different from the initially generated links;

generate visual data that illustrates the representation of the plurality of nodes from the set point of view; and provide the visual data for rendering on a display of a device.

24. A method for constructing dynamic relationships between data for presentation on a display, comprising:

accessing two or more data sources having two or more formats that are distinct in structure;

parsing data from the two or more data sources to produce a plurality of nodes that contain data from the two or more data sources;

initially generating links among the plurality of nodes, the links being generated based on data contained in the plurality of nodes, wherein the parsing of the data includes parsing textual data such that the textual data is used to define the generated links among the plurality of nodes without relying on data structure of database tables and entity relationships in a relational database to identify relationships among the plurality of nodes;

setting a point of view from one of the nodes of the plurality of nodes, the setting of the point of view acting to create links to a reordering of certain ones of the plurality of nodes, in response to the setting of the point of view, to produce a representation from the set point of view, the representation positioning certain nodes having an increased magnitude at a closer link distance from the set point of view and nodes having a decreased magnitude at a farther link distance from the set point of view, wherein based on the set point of view, certain ones of the plurality of nodes are excluded from the representation and the created links for the set point of view include at least one link different from the initially generated links;

generating visual data that illustrates the representation of the plurality of nodes from the set point of view, certain ones of the nodes identifying names of persons and data associated with the named persons, and the nodes are associated with other nodes based on relationships between the nodes, the representation presenting at least some of the relationships between the nodes; and providing the visual data for rendering on a display of a device, wherein the method is executed by a processor.

25. The method of claim 24, the providing of the visual data further comprising, forwarding the visual data to the device for execution by an application of the device.

26. The method of claim 24, wherein the visual data includes data for a user interface (UI) to be rendered on the device, the UI providing the representation in a textual format or a textual and graphical format, and an interaction with the UI is received providing information causing an update to the representation.

* * * * *